United States Patent
Watanabe

(10) Patent No.: US 7,571,931 B2
(45) Date of Patent: Aug. 11, 2009

(54) VEHICLE PASSENGER RESTRAINT SYSTEM

(75) Inventor: Yoichi Watanabe, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 232 days.

(21) Appl. No.: 11/083,280

(22) Filed: Mar. 18, 2005

(65) Prior Publication Data

US 2005/0230945 A1    Oct. 20, 2005

(30) Foreign Application Priority Data

Apr. 15, 2004    (JP)    ............... 2004-120656

(51) Int. Cl.
    *B60R 21/18*    (2006.01)
(52) U.S. Cl. ...................................... 280/733
(58) Field of Classification Search .............. 280/733; B60R 21/18
    See application file for complete search history.

(56) References Cited

U.S. PATENT DOCUMENTS

| | | | | |
|---|---|---|---|---|
| 3,682,498 A | * | 8/1972 | Rutzki | 280/733 |
| 3,975,037 A | * | 8/1976 | Hontschik et al. | 280/733 |
| 5,062,662 A | * | 11/1991 | Cameron | 280/733 |
| 5,288,104 A | * | 2/1994 | Chen | 280/733 |
| 5,472,231 A | * | 12/1995 | France | 280/733 |
| 5,924,726 A | * | 7/1999 | Pan | 280/733 |
| 6,286,860 B1 | * | 9/2001 | Adomeit et al. | 280/733 |
| 6,460,881 B1 | * | 10/2002 | Adomeit | 280/733 |
| 6,513,829 B1 | * | 2/2003 | Zumpano | 280/730.1 |
| 6,957,828 B2 | * | 10/2005 | Keeslar et al. | 280/733 |

FOREIGN PATENT DOCUMENTS

| | | | | |
|---|---|---|---|---|
| JP | | 63258239 A | * | 10/1988 |
| JP | | 11189117 A | * | 7/1999 |
| JP | | 2001-294111 A | | 10/2001 |
| WO | | WO-8807947 A | * | 10/1988 |

* cited by examiner

*Primary Examiner*—Paul N. Dickson
*Assistant Examiner*—Joselynn Y. Sliteris
(74) *Attorney, Agent, or Firm*—Global IP Counselors, LLP

(57) ABSTRACT

A vehicle passenger restraint system comprises a shoulder belt for restraining a passenger to a vehicle seat. The shoulder belt extends diagonally from a shoulder area on one side of the passenger to a waist area on the opposite side of the passenger and has a belt inflatable part configured to be inflated with a fluid upon a collision of the vehicle is detected. The belt inflatable part is provided with a head restraining part configured to deploy in the forward direction of the vehicle as the belt inflatable part inflates to receive the passenger's head. When the belt inflatable part inflates, tension is generated in the shoulder belt and the tension increases the force with which the passenger is restrained. Simultaneously, the head restraining part is inflated to receive the passenger's head and to prevent the passenger's head from contacting a frontward vehicle part.

20 Claims, 18 Drawing Sheets

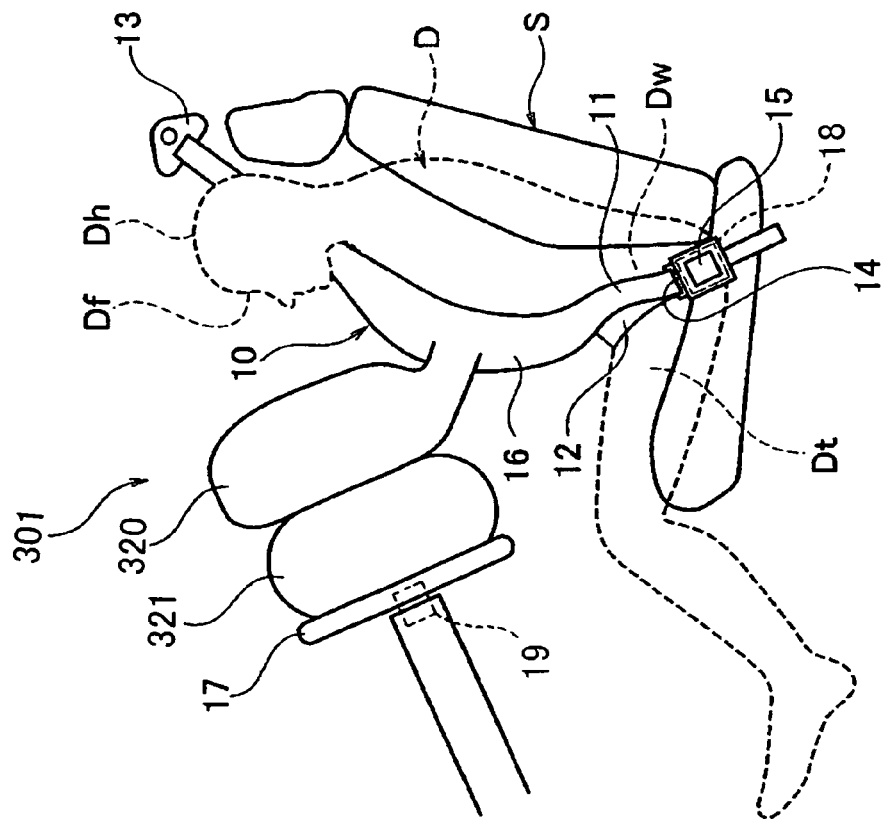
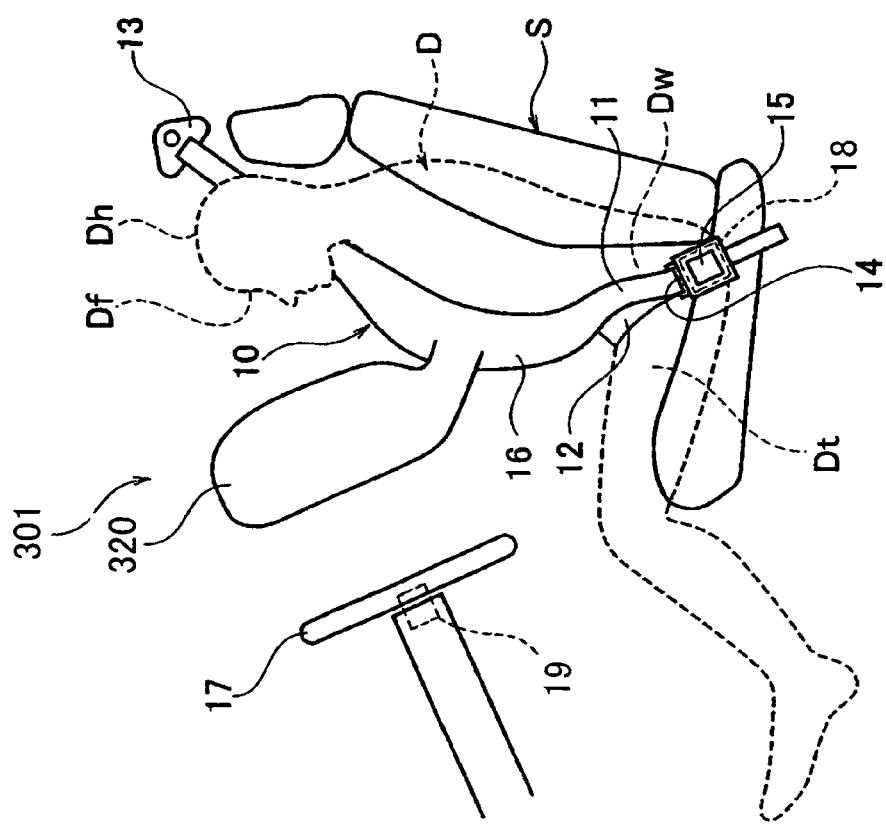

|  | INFLATOR OF BELT INFLATABLE PART | INFLATOR OF STEERING WHEEL AIRBAG |
|---|---|---|
| IMPACT VALUE < A | ON | OFF |
| A ≤ IMPACT VALUE | ON | ON |

VEHICLE PASSENGER RESTRAINT SYSTEM

CROSS-REFERENCE TO RELATED APPLICATIONS

This application claims priority to Japanese Patent Application No. 2004-120656. The entire disclosure of Japanese Patent Application No. 2004-120656 is hereby incorporated herein by reference.

BACKGROUND OF THE INVENTION

1. Field of the Invention

The present invention relates to a vehicle passenger restraint system utilizing a seatbelt with a shoulder belt. More specifically, the present invention relates to a vehicle passenger restraint system with a seatbelt having a belt inflatable part configured and arranged to be inflated upon a detection of an impact imparted to a vehicle.

2. Background Information

Japanese Laid-open Patent Publication No. 2001-294111 discloses a conventional vehicle passenger restraint system employing a seatbelt including a shoulder belt and a lap belt. In this conventional vehicle passenger restraint system, the shoulder belt of the seatbelt includes a belt inflatable part so that a high-pressure gas generated by an inflator is introduced into the belt inflatable part when the vehicle undergoes a collision, thereby inflating the belt inflatable part and generating tension in the shoulder belt. The tension is transmitted even to the lap belt and serves to increase the force with which the passenger is restrained to the seat by the seatbelt.

In view of the above, it will be apparent to those skilled in the art from this disclosure that there exists a need for an improved vehicle passenger restraint system. This invention addresses this need in the art as well as other needs, which will become apparent to those skilled in the art from this disclosure.

SUMMARY OF THE INVENTION

Although the conventional vehicle passenger restraint systems as disclosed in the above mentioned reference is configured and arranged to increase the restraining force of the seatbelt with respect to the upper body of the passenger by employing the belt inflatable part, such conventional vehicle passenger restraint system cannot restrain a head portion of the passenger any more than a usual seatbelt can. Therefore, frontward airbags such as a steering wheel airbag and a passenger seat airbag are required in front of the passenger to protect the head portion of the passenger. These frontward airbags are usually inevitably large to reliably protect the head portion of the passenger when the vehicle undergoes a collision. Since the frontward airbags are large, they require large storage spaces. Thus, designing the layout of the storage spaces for these large frontward airbags is troublesome. In particular, the steering wheel airbag reduces the design freedom of the steering wheel.

Therefore, one object of the present invention is to provide a vehicle passenger restraint system in which the seatbelt itself is provided with the capability of restraining the head portion of the passenger, thereby enabling the frontward airbag to be eliminated or reduced in size.

In order to achieve the above identified object and other objects of the present invention, a vehicle passenger restraint system is provided that comprises a shoulder belt, a belt inflatable part, an inflatable head restraining part. The shoulder belt is configured and arranged to extend diagonally from a first side of a passenger in a shoulder area to a second side of the passenger that is opposite from the first side in a waist area to restrain the passenger to a seat of a vehicle. The belt inflatable part is coupled to the shoulder belt, and configured and arranged to be inflated with a fluid. The head restraining part is coupled to the shoulder belt, and configured and arranged to expand in a forward direction of the vehicle relative to the shoulder belt to restrain forward movement of a head portion of the passenger as the belt inflatable part is inflated.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 6(*b*) is a left side elevational view of the vehicle passenger restraint system when a head restraining part and a steering wheel airbag of the vehicle passenger restraint system are in a deployed state in accordance with the third embodiment of the present invention;

FIG. 7(*a*) is a left side elevational view of a vehicle passenger restraint system when a head restraining part of the vehicle passenger restraint system is in a deployed state in accordance with a fourth embodiment of the present invention;

FIG. 7(*b*) is a left side elevational view of the vehicle passenger restraint system when a head restraining part and a steering wheel airbag of the vehicle passenger restraint system are in a deployed state in accordance with the fourth embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
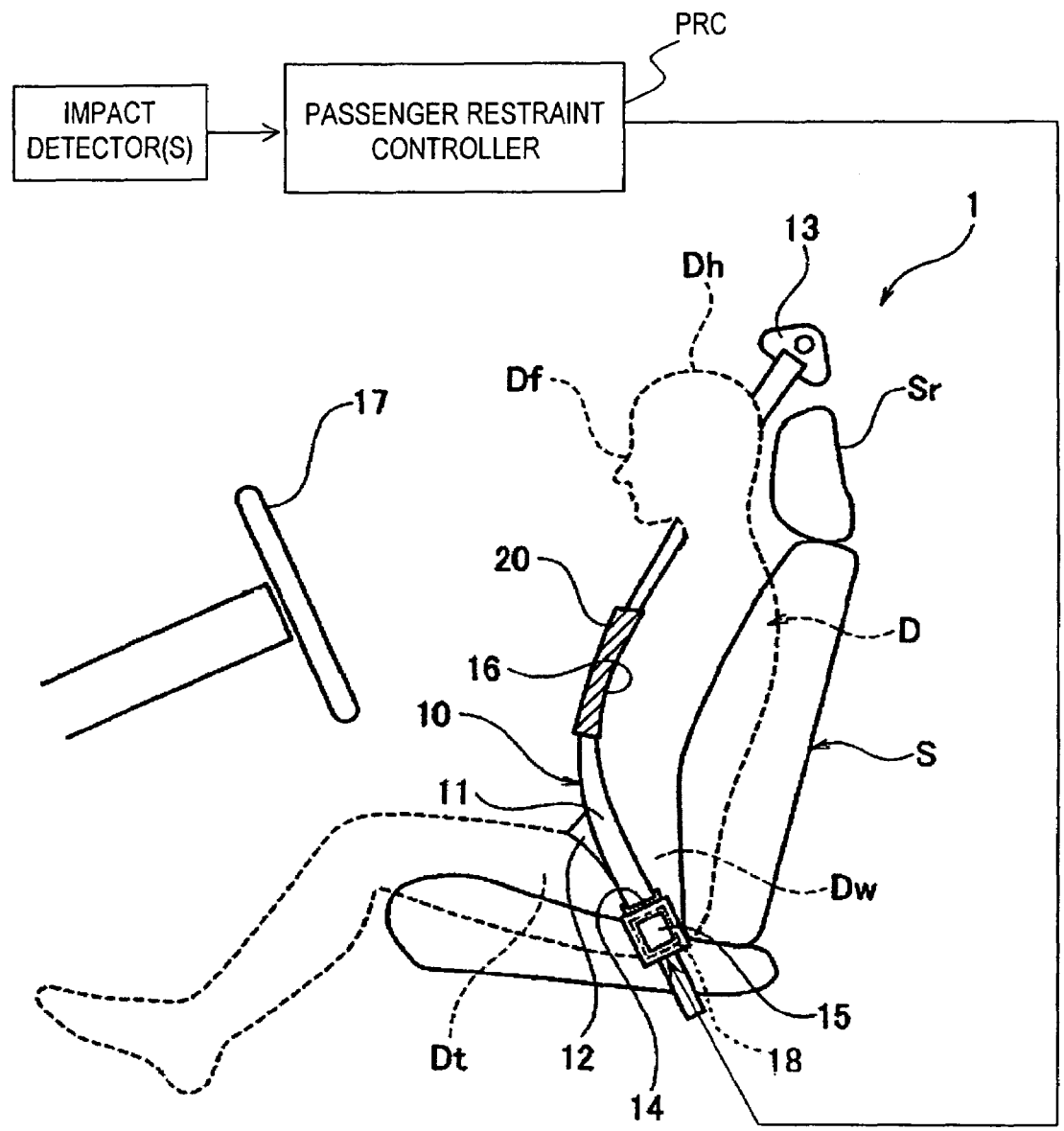
FIG. 1 is a left side elevational view of a vehicle passenger restraint system in a normal state in accordance with a first embodiment of the present invention.
Figure 2:
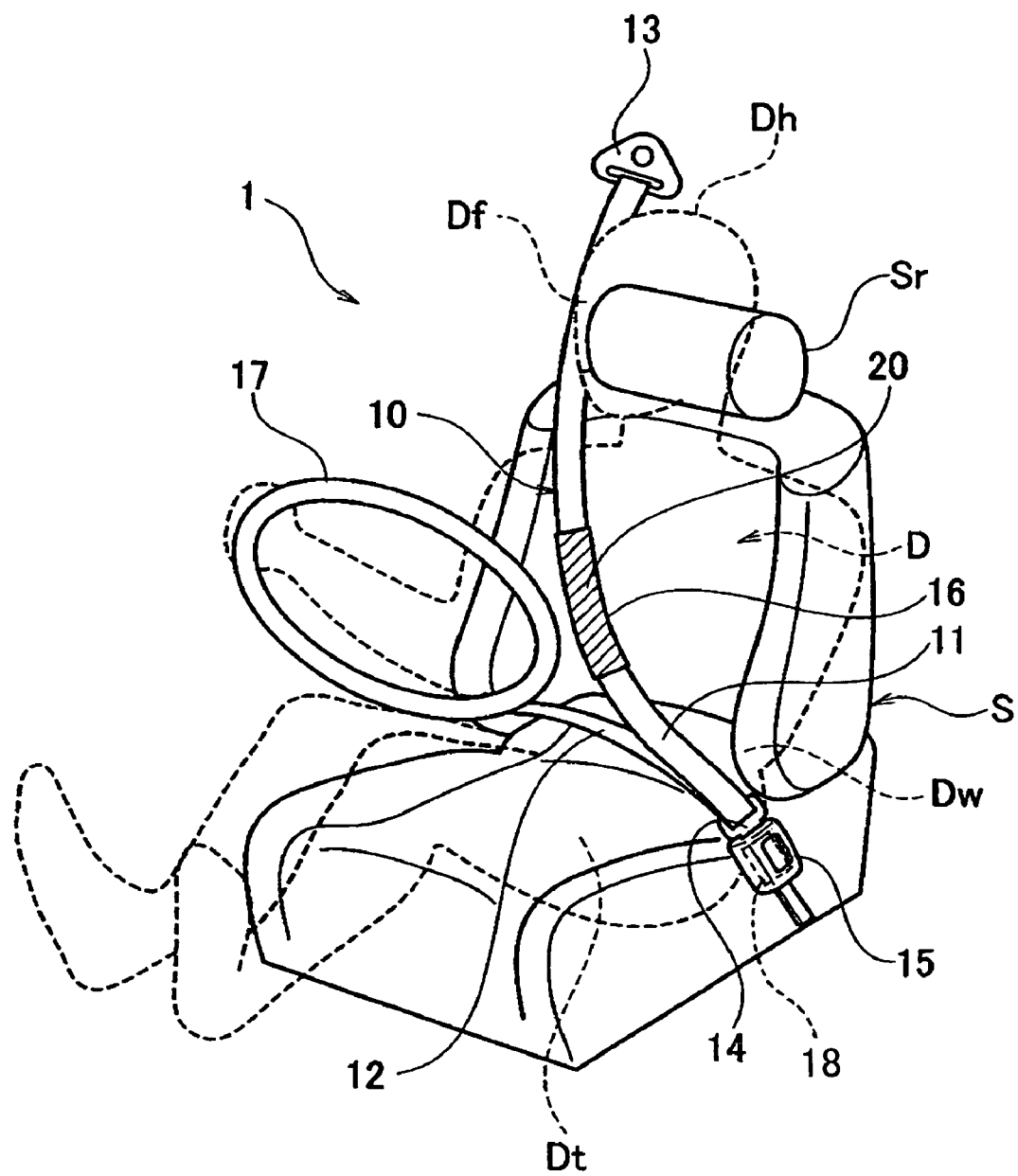
FIG. 2 is a frontal perspective view of the vehicle passenger restraint system in the normal state in accordance with the first embodiment of the present invention.

Referring initially to FIGS. 1 to 4, a vehicle passenger restraint system 1 is illustrated in accordance with a first embodiment of the present invention. FIG. 1 is a left side elevational view of the vehicle passenger restraint system 1 in a normal state. FIG. 2 is a frontal perspective view of the vehicle passenger restraint system 1 in the normal state.

As shown in FIGS. 1 and 2, the vehicle passenger restraint system 1 of the first embodiment basically comprises a three-point seatbelt (hereinafter referred as "seatbelt") 10. FIGS. 1 and 2 illustrate an example in which the seatbelt 10 is applied to a driver's seat S. In the embodiments explained below, the driver's seat S is configured and arranged to be disposed in the right side of the vehicle.

The seatbelt 10 is configured and arranged to restrain a passenger D seated in the driver's seat S. The seatbelt 10 comprises a shoulder belt 11 and a lap belt 12. The shoulder belt 11 is configured and arranged to extend diagonally from a shoulder area on a first side (on the right side in the example shown in FIGS. 1 and 2) of the passenger D to a waist area Dw on a second side (on the left side in the example shown in FIGS. 1 and 2) of the passenger D. The lap belt 12 is configured and arranged to extend across a thigh area Dt of the passenger D.

A first end portion of the shoulder belt 11 that is disposed in the first side of the passenger D is arranged to pass through a shoulder through ring 13 provided on an upper end part of a vehicle body (e.g., a center pillar) and to fold back downward from the shoulder through ring 13. The first end portion of the shoulder belt 11 is then wound onto a retractor provided on a lower part of the vehicle body. A second end portion of the shoulder belt 11 is continuously formed with a first end portion of the lap belt 12 such that the shoulder belt 11 and the lap belt 12 form a single continuous belt passing through a tongue 14 arranged therebetween. A second end portion of the lap belt 12, which is opposite from the first end portion of the lap belt 12 coupled to the tongue 14, is connected to the vehicle body at a bottom part of the driver's seat S on the first side of the driver's seat S. The second end portion of the lap belt 12 is connected directly to the vehicle body, or connected through a retractor or the like. The tongue 14 is configured and arranged to be freely attached to and detached from an inner buckle 15 that is connected to the vehicle body on the second side of the driver's seat S.

Thus, in FIGS. 1 and 2, the shoulder through ring 13 in which the first end portion of the shoulder belt 11 passes through is arranged toward the outside of the passenger compartment with respect to the driver's seat S, and the tongue 14 and the inner buckle 15 to which the second end portion of the shoulder belt 11 is coupled are arranged toward the inside of the passenger compartment with respect to the driver's seat S.

As seen in FIGS. 1 and 2, the shoulder belt 11 has a bag-shaped belt inflatable part 16 at a position corresponding to a chest area of the passenger D. The belt inflatable part 16 is configured and arranged to be inflated by, for example, a high-pressure gas generated by an inflator 18 provided in the inner buckle 15, as described in Japanese Laid-open Patent Publication No. 2001-294111 mentioned above. The inflator 18 is configured to operate (i.e., generate a high-pressure gas) when a front collision or the like causes an impact imparted from the front of the vehicle to be detected. More specifically, the vehicle passenger restraint system 1 of the present invention is preferably provided with a passenger restraint controller PRC configured and arranged to control the inflator 18 to deploy the belt inflatable part 16 upon detection of the impact imparted from the front of the vehicle in the impact detector (s).

A steering wheel 17 is positioned in the frontward direction of the vehicle relative to the passenger D. The steering wheel 17 in the first embodiment of the present invention constitutes a frontward vehicle part.

The belt inflatable part 16 of the shoulder belt 11 of the present invention is provided with an additional airbag 20 (a head restraining part) configured and arranged to deploy in the forward direction of the vehicle as the belt inflatable part 16 inflates to receive a head portion Dh of the passenger D.

The belt inflatable part 16 and the additional airbag 20 are arranged to communicate with each other so that when a fluid or gas is introduced to the belt inflatable part 16, the additional airbag 20 is inflated together with the belt inflatable part 16. The additional airbag 20 is folded up to be stored in the belt inflatable part 16 in the normal state as shown in FIGS. 1 and 2. The additional airbag 20 is configured and arranged to be inflated together with the belt inflatable part 16 when the inflator 18 operates upon a detection of an impact imparted from the front of the vehicle.

Figure 3:
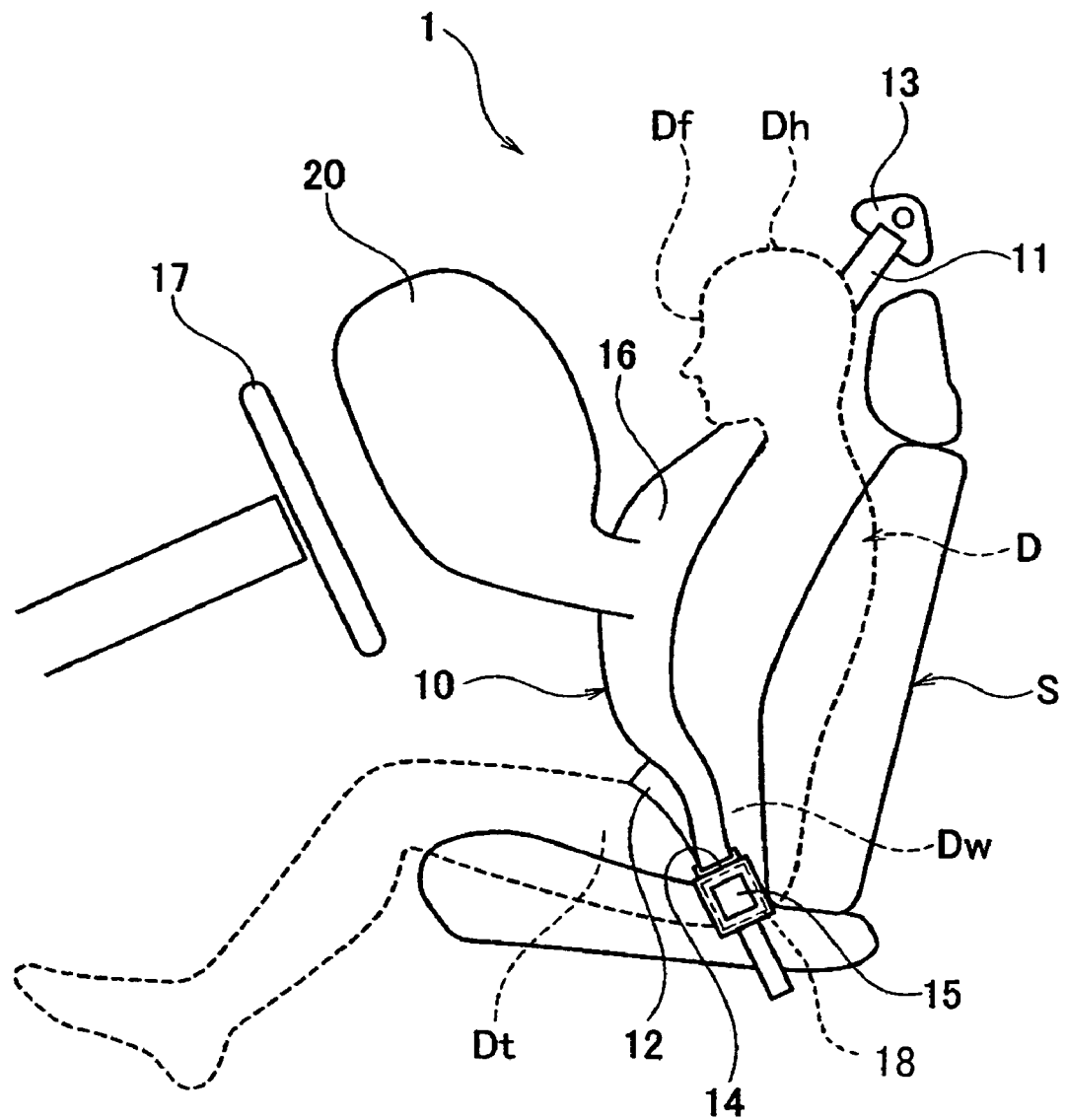
FIG. 3 is a left side elevational view of the vehicle passenger restraint system when a head restraining part of the vehicle passenger restraint system is in a deployed state in accordance with the first embodiment of the present invention.
Figure 4:
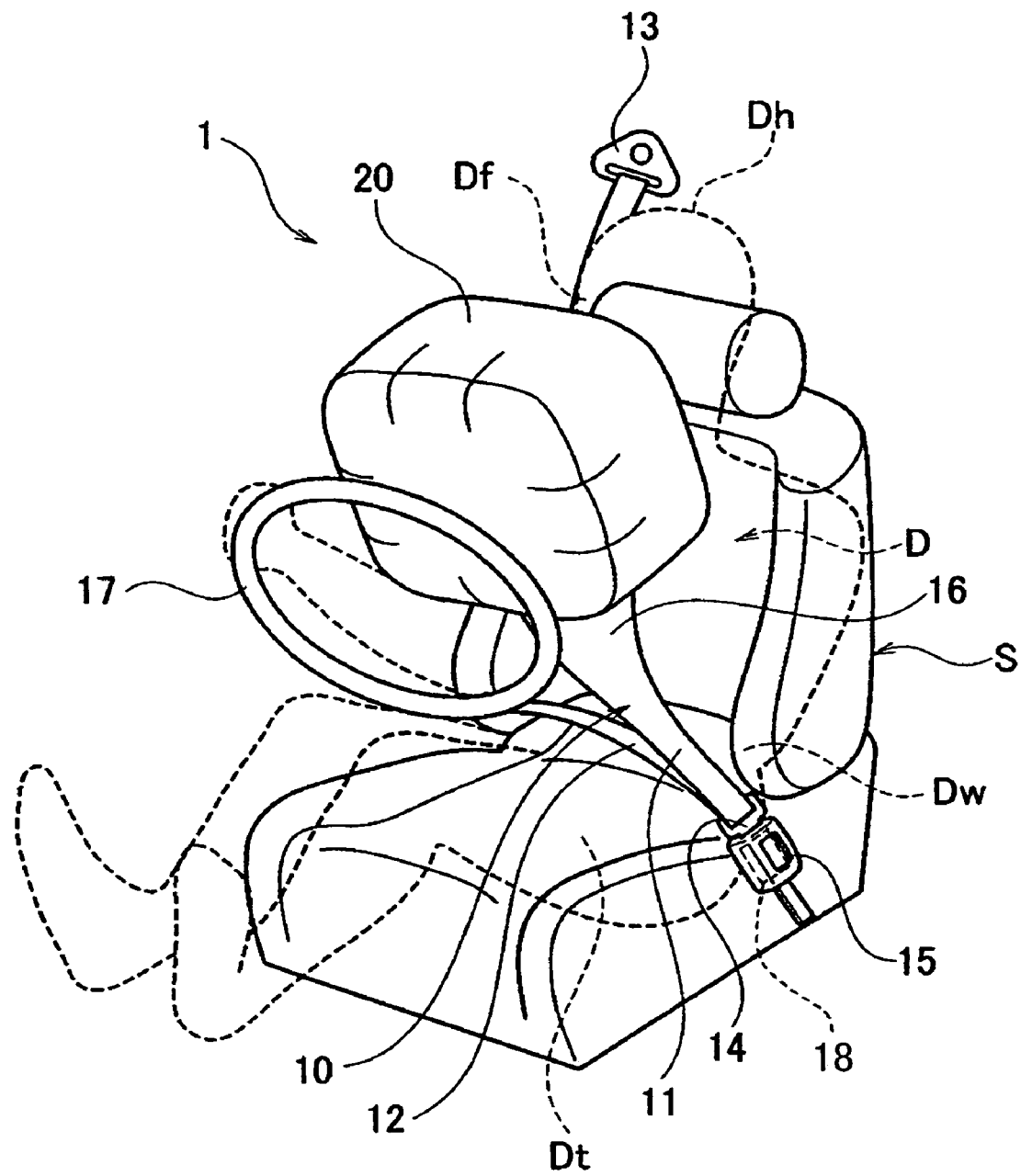
FIG. 4 is a frontal perspective view of the vehicle passenger restraint system when the head restraining part of the vehicle passenger restrains system is in the deployed state in accordance with the first embodiment of the present invention.

FIG. 3 is a left side elevational view of the vehicle passenger restraint system 1 when the additional airbag 20 is in a deployed state. FIG. 4 is a frontal perspective view of the vehicle passenger restraint system 1 when the additional airbag 20 is in the deployed state.

As shown in FIGS. 3 and 4, the additional airbag 20 is configured and arranged to be positioned between the steering wheel 17 and the head portion Dh of the passenger D when the additional airbag 20 is deployed in the forward direction. As shown in FIG. 4, the additional airbag 20 in the first embodiment preferably has a generally cubic shape and is arranged to be larger than the steering wheel 17 when the additional airbag 20 is inflated. Thus, with the first embodiment of the present invention, when a front collision or the like causes an impact imparted from the front side of the vehicle to be detected, the inflator 18 operates and introduces a high-pressure gas into the belt inflatable part 16. As the belt inflatable part 16 inflates, the high-pressure gas is also introduced into the additional airbag 20 because the additional airbag 20 is arranged to communicate with the belt inflatable part 16. Thus, the additional airbag 20 expands in the forward direction of the vehicle as seen in FIGS. 3 and 4.

The expansion of the belt inflatable part 16 of the seatbelt 10 causes tension to develop in the shoulder belt 11 and the lap belt 12, and increases the force with which the passenger D is restrained to the driver's seat S by the seatbelt 10. At the same time, as shown in FIGS. 3 and 4, the additional airbag 20 is configured and arranged to expand forward to be positioned between the head portion Dh of the passenger D and the steering wheel 17. Thus, the additional airbag 20 is configured and arranged to receive the head portion Dh of the passenger D as the passenger D bends forward due to the front collision. Consequently, the head portion Dh of the passenger D is prevented from contacting the steering wheel 17 by deploying the additional airbag 20.

As a result, a frontward airbag such as a steering wheel airbag conventionally provided in the steering wheel 17 can be eliminated, and thus, it is not necessary to provide a storage space for the steering wheel airbag in the steering wheel 17. Therefore, the steering wheel 17 can be made more lightweight and the degree of design freedom for the steering wheel 17 can be greatly increased.

In the first embodiment of the present invention, the additional airbag 20 has the generally cubic shape as seen in FIGS. 3 and 4, which has a generally rectangular shape in a plan view. Of course, it will be apparent to those skilled in the art from this disclosure that the invention is not limited to the shape of the additional airbag 20 as shown in FIGS. 3 and 4. For example, it is also acceptable for the additional airbag 20 to have another shape in a plan view, e.g., a circular or oval shape. In short, any shape is acceptable as long as the additional airbag 20 is large enough to cover the steering wheel 17 to prevent the direct contact between the head portion Dh of the passenger D and the steering wheel 17.

Accordingly, with the vehicle passenger restraint system 1 of the first embodiment, the additional airbag 20 is configured and arranged to deploy in the forward direction of the vehicle as the belt inflatable part 16 inflates. Therefore, tension is generated in the shoulder belt 11 and the force with which the passenger D is restrained is increased while the head portion Dh of the passenger D is prevented from contacting the steering wheel 17 with the additional airbag 20 being configured and arranged to receive the head portion Dh of the passenger D as a result of the inflation of the belt inflatable part 16.

Second Embodiment

Figure 5:
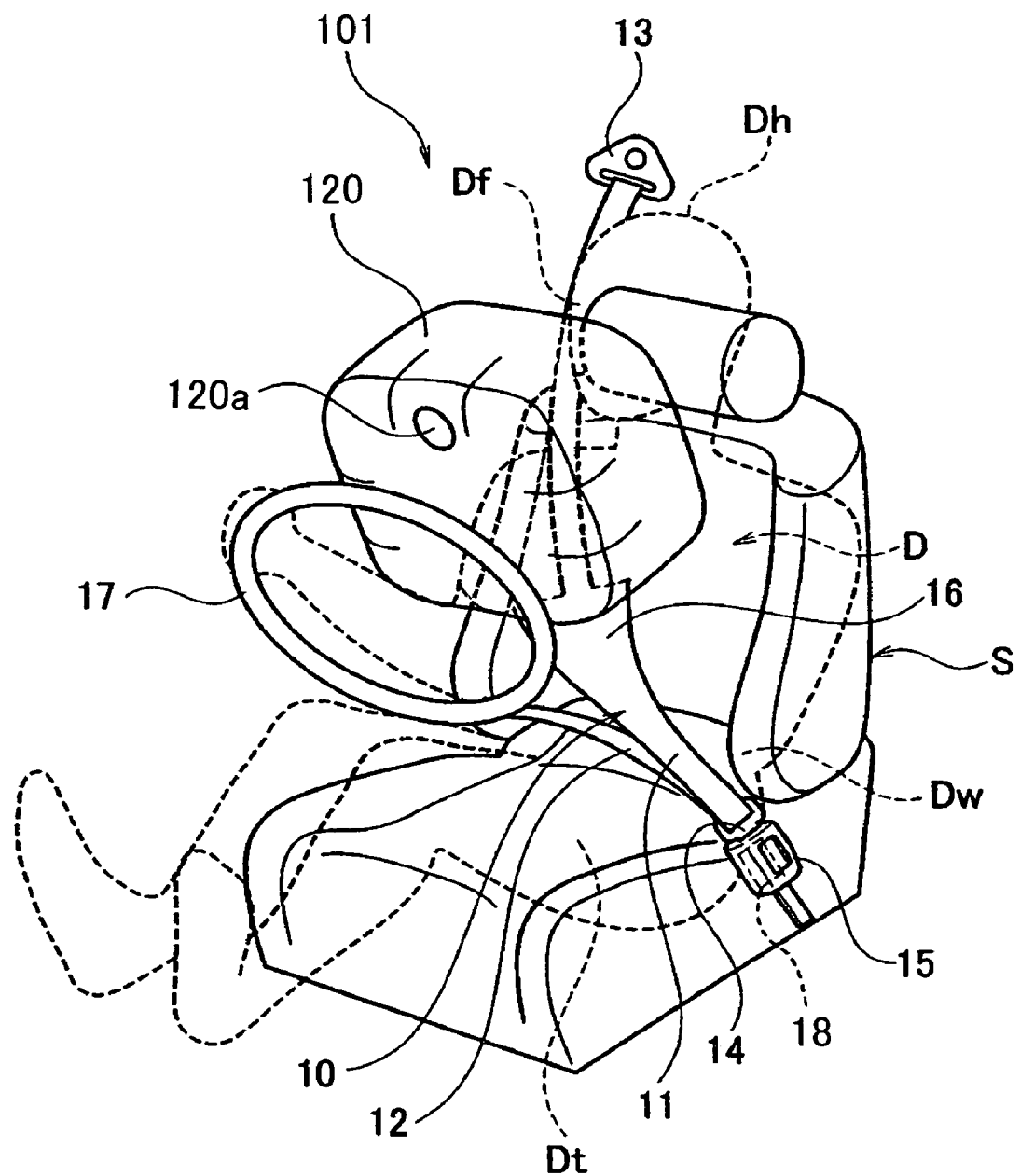
FIG. 5 is a frontal perspective view of a vehicle passenger restraint system when a head restraining part of the vehicle passenger restraint system is in a deployed state in accordance with a second embodiment of the present invention.

Referring now to FIG. 5, a vehicle passenger restraint system 101 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The vehicle passenger restraint system 101 of the second embodiment is basically identical to the vehicle passenger restraint system 1 of the first embodiment except that an additional airbag 120 of the second embodiment is provided with a fluid discharge port 120a configured and arranged to adjust a resistance force (an impact absorbency) of the additional airbag 120.

FIG. 5 is a frontal perspective view of the vehicle passenger restraint system 101 when the additional airbag 120 is in the deployed state.

As shown in FIG. 5, the fluid discharge port 120a is formed on the additional airbag 120 on an upper edge portion of a front surface thereof. The fluid discharge port 120a is configured and arranged to have a prescribed discharge resistance with respect to the enclosed gas inside the additional airbag 120. The impact absorbency of the additional airbag 120 can be adjusted by releasing the fluid from the fluid discharge port 120a when the head portion Dh of the passenger D strikes the additional airbag 120. As in the first embodiment, the additional airbag 120 and the belt inflatable part 16 are arranged such that the gas can communicate between the additional airbag 120 and the belt inflatable part 16.

Although in the second embodiment the fluid discharge port 120a is provided on the upper edge portion of the front surface of the additional airbag 120, the fluid discharge port 120a can be provided on any part of the additional airbag 120 as long as the fluid discharge port 120a will not interfere with the head portion Dh of the passenger D when the additional airbag 120 is deployed. The fluid discharge port 120a is required to be provided on the additional airbag 120, not on the belt inflatable part 16.

Thus, with the vehicle passenger restraint system 101 of the second embodiment, the high-pressure gas generated by the inflator 18 is supplied to the additional airbag 120 through the belt inflatable part 16. Since only the additional airbag 120 has the fluid discharge port 120a, the gas is introduced rapidly from the belt inflatable part 16 to the additional airbag 120 and the additional airbag 120 can be inflated quickly.

When the head portion Dh of the passenger D strikes the additional airbag 120, the gas can escape to an appropriate degree through the fluid discharge port 120a. Thus, the energy of the impact of the head portion Dh of the passenger D against the additional airbag 120 can be efficiently absorbed by the additional airbag 120.

Third Embodiment

Figure 6A:
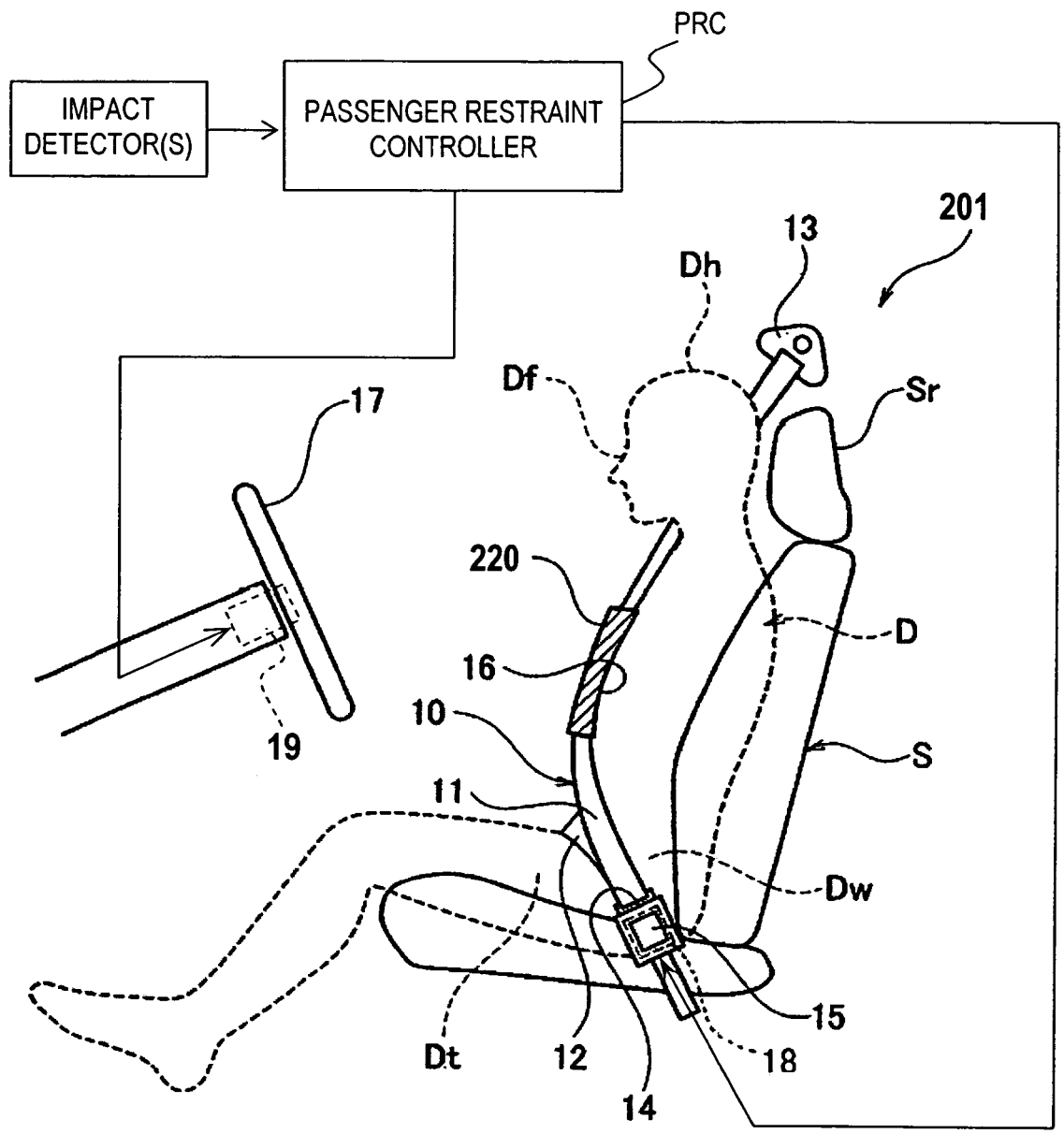
FIG. 6(*a*) is a left side elevational view of a vehicle passenger restraint system in a normal state in accordance with a third embodiment of the present invention.
Figure 6B:
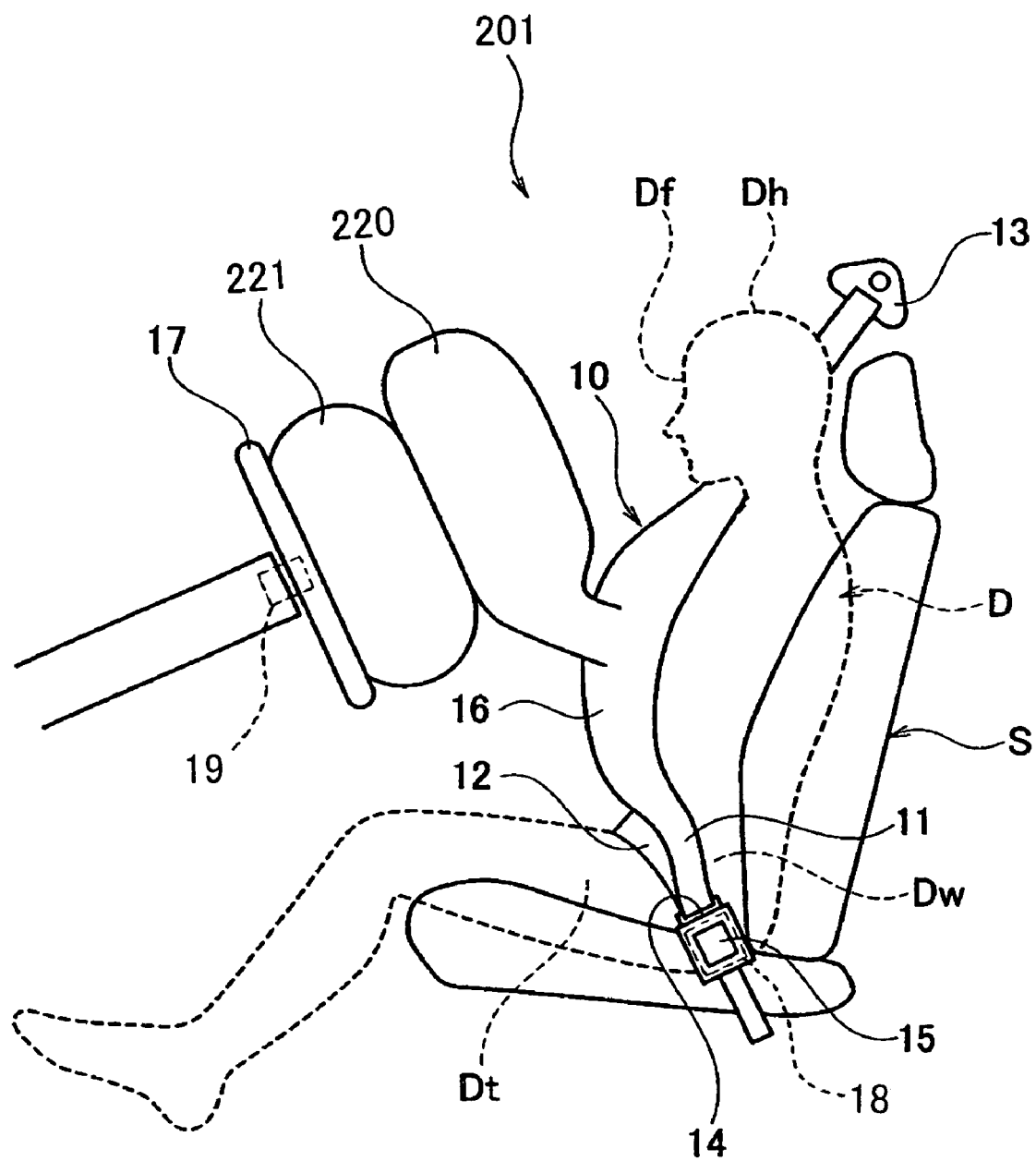

Referring now to FIG. 6, a vehicle passenger restraint system 201 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The vehicle passenger restraint system 201 of the third embodiment differs from the vehicle passenger restraint system 1 of the first embodiment in that the vehicle passenger restraint system 201 of the third embodiment further include a steering wheel airbag 221 (a frontward airbag) that is provided in the steering wheel 17 as well as an additional airbag 220.

FIG. 6 is a left side elevational view of the vehicle passenger restraint system 201 of the third embodiment when the additional airbag 220 and the steering wheel airbag 221 are in the deployed state.

As explained above, in addition to the additional airbag 220 that is similar to the additional airbag 20 of the first embodiment, the vehicle passenger restraint system 201 of the third embodiment also comprises the steering wheel airbag 221 that is provided in the steering wheel 17 as seen in FIG. 6. The steering wheel airbag 221 is configured and arranged to deploy when an impact imparted from the front of the vehicle is detected. The steering wheel airbag 221 is configured and arranged to support the additional airbag 220 to receive the head portion Dh of the passenger D.

The steering wheel airbag 221 is arranged as a conventional frontward airbag that is provided in the steering wheel 17 and is preferably stored in a central portion of the steering wheel 17. The steering wheel airbag 221 is configured and arranged to be inflated by a high-pressure gas generated by an inflator 19 of an airbag unit that is built into the steering wheel 17 to cover the side of the steering wheel 17 that faces the passenger D when a front collision or the like occurs. More specifically, the vehicle passenger restraint system 201 of the third embodiment is preferably provided with a passenger restraint controller PRC configured and arranged to control the inflator 18 and the inflator 19 to deploy the additional airbag 220 and the steering wheel airbag 221, respectively, upon detection of the impact imparted from the front of the vehicle in the impact detector(s).

Thus, with the vehicle passenger restraint system 201 of the third embodiment, when a front collision or the like causes an impact imparted from the front of the vehicle to be detected, the inflator 18 of the belt inflatable part 16 is configured and arranged to operate and inflate the belt inflatable part 16 and the additional airbag 220 and, substantially simultaneously, the inflator 19 of the steering wheel airbag 221 is configured and arranged to operate and inflate the steering wheel airbag 221. As a result, as shown in FIG. 6, both the additional airbag 220 and the steering wheel airbag 221 are disposed between the head portion Dh of the passenger D and the steering wheel 17. Therefore, the head portion Dh of the passenger D can be protected with two airbags.

Thus, with the third embodiment of the present invention where the steering wheel airbag 221 is provided, the size of the steering wheel airbag 221 can be reduced. Therefore, the weight of the steering wheel 17 can be reduced and the degree of design freedom of the steering wheel 17 can be increased in comparison to when only a conventional steering wheel airbag is used to protect the head portion Dh of the passenger D.

Moreover, with the third embodiment of the present invention, the size of the additional airbag 220 can also be reduced. Thus, the space required for storing the folded additional airbag 220 in the shoulder belt 11 can be reduced.

Of course, it will be apparent to those skilled in the art from this disclosure that the additional airbag 220 can be provided with the fluid discharge port 120a as in the second embodiment.

Fourth Embodiment

Figures 8, 9:
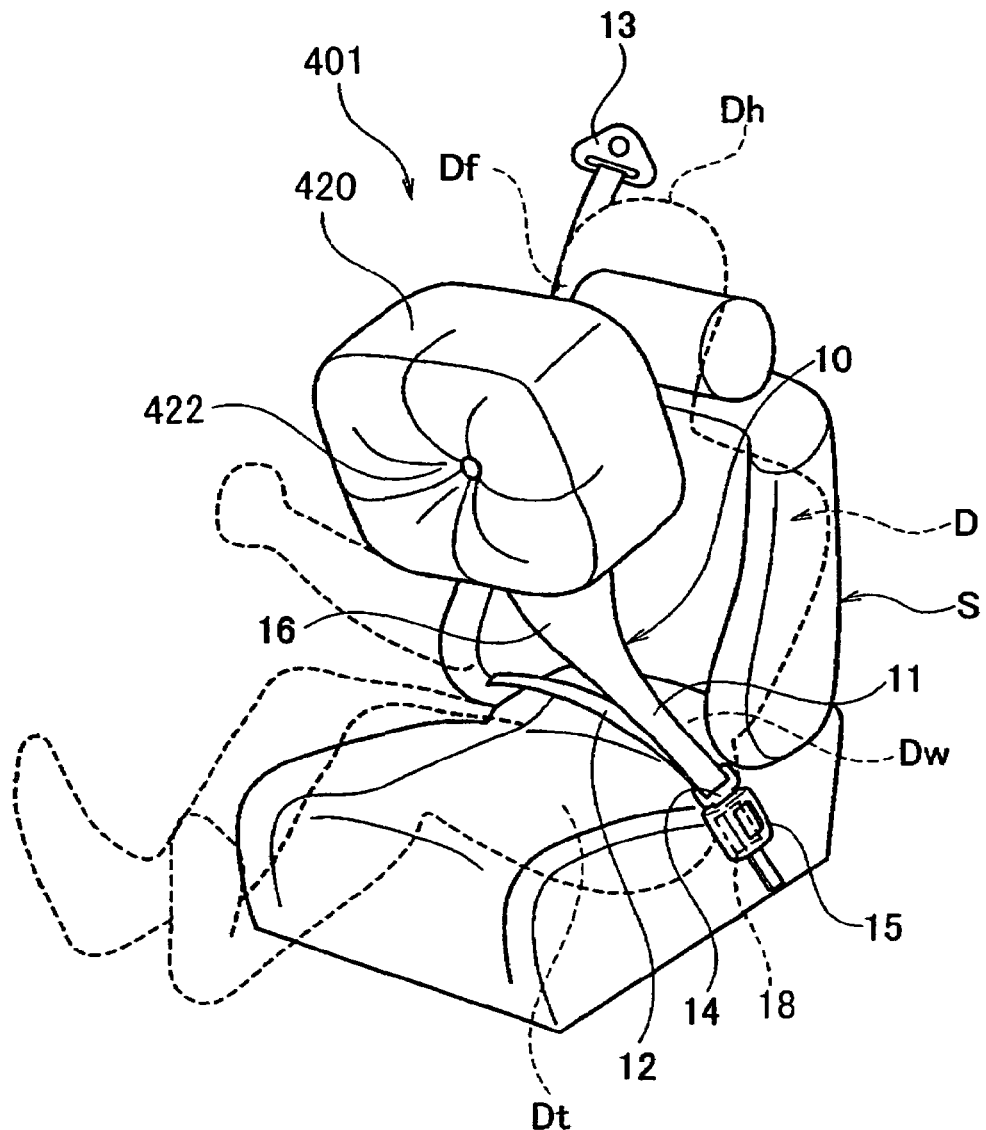
FIG. 8 is a table indicating operating states of inflators of a belt inflatable part and the steering wheel airbag of the vehicle passenger restraint system in accordance with the fourth embodiment of the present invention.
FIG. 9 is a frontal perspective view of a head restraining part of a vehicle passenger restraint system in a deployed state in accordance with a fifth embodiment of the present invention.

Referring now to FIGS. 7(a), 7(b) and 8, a vehicle passenger restraint system 301 in accordance with a fourth embodiment will now be explained. In view of the similarity between the third and fourth embodiments, the parts of the fourth embodiment that are identical to the parts of the third embodiment will be given the same reference numerals as the parts of the third embodiment. Moreover, the descriptions of the parts of the fourth embodiment that are identical to the parts of the third embodiment may be omitted for the sake of brevity.

The vehicle passenger restraint system 301 of the fourth embodiment differs from the vehicle passenger restraint system 201 of the third embodiment in that a steering wheel airbag 321 is configured and arranged to deploy only when an impact value indicative of an impact force is detected to be equal to or greater than a threshold value A.

FIGS. 7(a) and 7(b) are left side elevational views of the vehicle passenger restraint system 301 illustrating two different cases regarding the deployment of an additional airbag 320 and the steering wheel airbag 321. FIG. 8 is a table indicating the operating states of the inflators 18 and 19 of the belt inflatable part 16 and the steering wheel airbag 321.

As shown in FIGS. 7(a) and 7(b), the vehicle passenger restraint system 301 of the fourth embodiment comprises the steering wheel airbag 321 in addition to the additional airbag 320, as in the third embodiment. In the fourth embodiment, the steering wheel airbag 321 is configured and arranged to deploy when the impact is detected with a magnitude that is equal to or larger than the threshold value A which is set to a magnitude of impact at or above which the steering wheel airbag 321 should be deployed.

As shown in FIG. 8, the vehicle passenger restraint system 301 of the fourth embodiment is configured such that the inflator 18 of the belt inflatable part 16 is operated (turn ON) and the additional airbag 320 is inflated upon a detection of an impact imparted from the front of the vehicle regardless of whether the impact value is smaller than the threshold value A or not. On the other hand, the inflator 19 of the steering wheel airbag 321 does not operate (remain OFF) when the impact value is less than the threshold value A, but does operate (turn ON) when the impact value is equal to or larger than the threshold value A. Thus, only the additional airbag 320 is inflated as shown in FIG. 7(a) when the impact value is less than the threshold value A and both the additional airbag 320 and the steering wheel airbag 321 are inflated as shown in FIG. 7(b) when the impact value is equal to or larger than the threshold value A.

Thus, with the vehicle passenger restraint system 301 of the fourth embodiment, when the impact force of a collision is relatively large (i.e., the impact value is equal to or larger than the threshold value A) and the head portion Dh of the passenger D falls forward with a large inertia force, the energy absorbing capacity of the vehicle passenger restraint system 301 can be increased by inflating both the additional airbag 320 and the steering wheel airbag 321.

Fifth Embodiment

Referring now to FIGS. 9 to 13, a vehicle passenger restraint system 401 in accordance with a fifth embodiment will now be explained. In view of the similarity between the third and fifth embodiments, the parts of the fifth embodiment that are identical to the parts of the third embodiment will be given the same reference numerals as the parts of the third embodiment. Moreover, the descriptions of the parts of the fifth embodiment that are identical to the parts of the third embodiment may be omitted for the sake of brevity.

The vehicle passenger restraint system 401 of the fifth embodiment is basically identical to the vehicle passenger restraint system 201 of the third embodiment except that an additional airbag 420 is provided with a recess part 422, and the deployments of the additional airbag 420 and a steering wheel airbag 421 are separated by a time delay so that the additional airbag 420 deploys first and the steering wheel airbag 421 deploys after a prescribed amount of time has elapsed since the additional airbag 420 is inflated.

Figure 10:
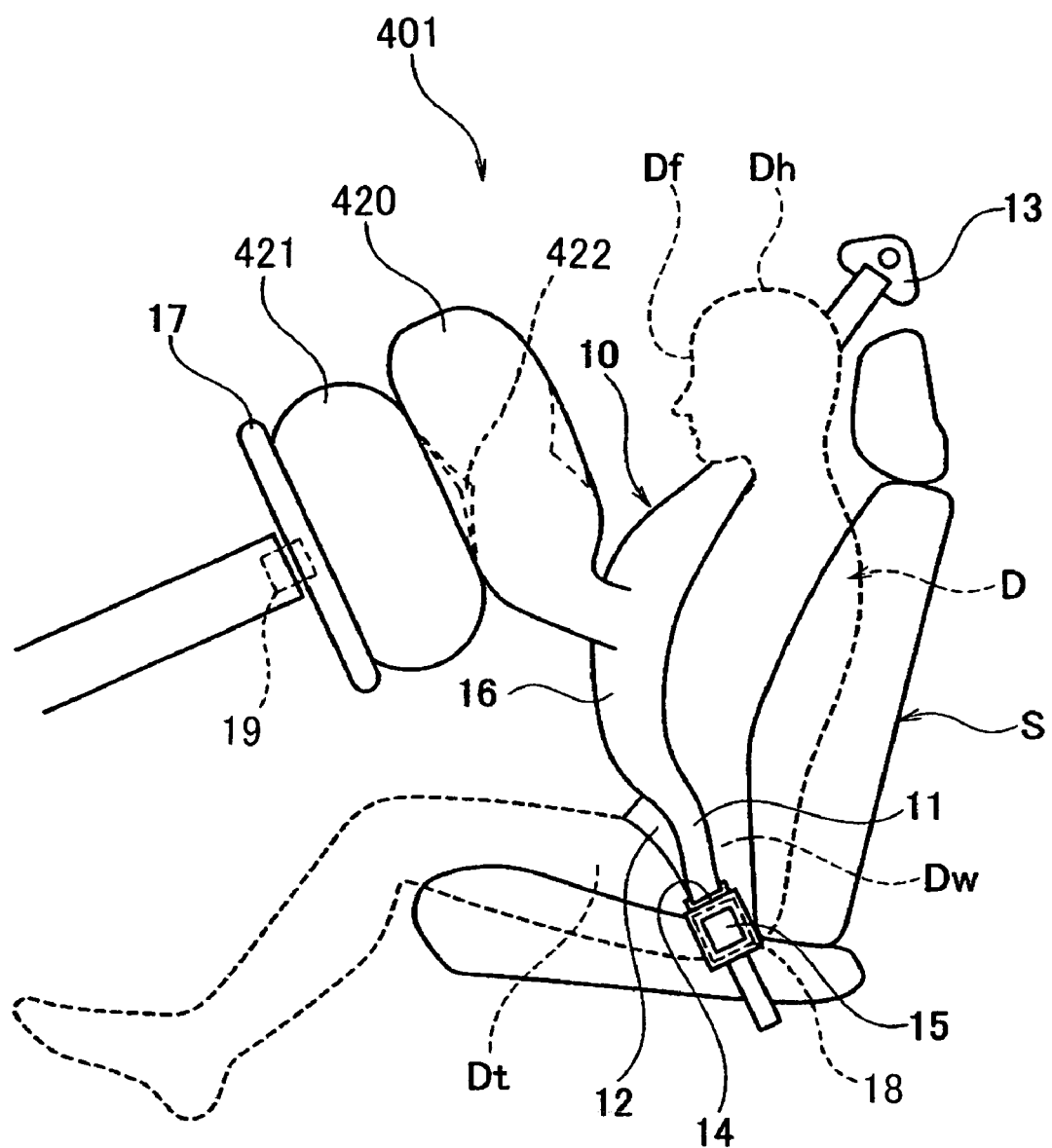
FIG. 10 is a left side elevational view of the vehicle passenger restraint system when the head restraining part and the steering wheel airbag of the vehicle passenger restraint system are in the deployed state in accordance with the fifth embodiment of the present invention.
Figure 11:
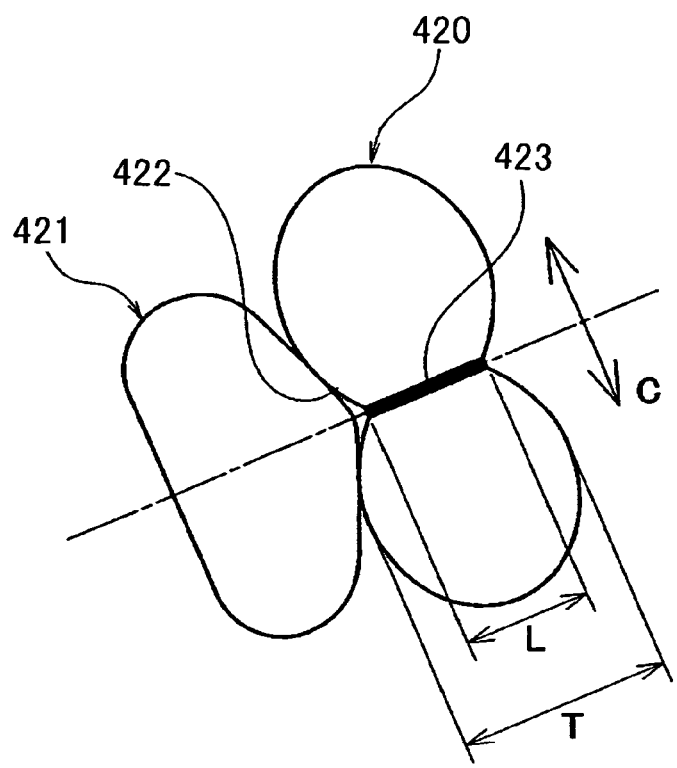
FIG. 11 is a diagrammatic cross sectional view of the head restraining part and the steering wheel airbag in the deployed state in accordance with the fifth embodiment of the present invention.

FIG. 9 is a frontal perspective view of the additional airbag 420 in the deployed state. FIG. 10 is a side elevational view of the vehicle passenger restraint system 401 when the additional airbag 420 and the steering wheel airbag 421 are in the deployed states. FIG. 11 is a diagrammatic cross sectional view illustrating the additional airbag 420 and the steering wheel airbag 421 the deployed state.

As shown in FIGS. 9 to 11, the vehicle passenger restraint system 401 of the fifth embodiment comprises the additional airbag 420 with the recess part 422 on a lower surface thereof that is arranged to contact with the steering wheel airbag 421 when the additional airbag 420 and the steering wheel airbag 421 are inflated. The recess part 422 is configured and arranged to receive or retain the steering wheel airbag 421 to prevent a relative displacement between the additional airbag 420 and the steering wheel airbag 421. Thus, in the fifth embodiment of the present invention, the recess part 422 constitutes a displacement prevention mechanism. Of course, it will be apparent to those skilled in the art from this disclosure that the displacement prevention mechanism (the recess part 422) can be provided on the steering wheel airbag 421 instead of on the additional airbag 420. In such a case, a recess part is provided on a surface of the steering wheel airbag 421 that is arranged to contact with the additional airbag 420 when both the additional airbag 420 and the steering wheel airbag 421 are inflated so that the recess part retains the additional airbag 420 to prevent the relative displacement between the additional airbag 420 and the steering wheel airbag 421.

In the fifth embodiment, the recess part 422 is preferably provided in a center portion of the lower surface of the additional airbag 420 as seen in FIGS. 9 and 10. As mentioned above, the recess part 422 is configured and arranged to receive a center portion of an upper surface of the steering wheel airbag 421 when both of the additional airbag 420 and the steering wheel airbag 421 are inflated. The recess part 422 is preferably formed by providing a suspension cord 423 serving as an expansion restricting member inside the additional airbag 420 as shown in FIG. 11. The suspension cord 423 is configured and arranged to suppress inflation along the perimeter of the portion where the suspension cord 423 is provided to form the recess part 422.

More specifically, the suspension cord 423 joins the center portion of the upper surface of the additional airbag 420 to the center portion of the lower surface of the additional airbag 420. As seen in FIG. 11, the suspension cord 423 is configured and arranged such that a length L of the suspension cord 423 is shorter than a thickness T of the periphery of the recess part 422 (i.e., a thickness of the additional airbag 420) when the additional airbag 420 is fully inflated. Therefore, the suspension cord 423 is configured and arranged to restrict inflation at the portion where the suspension cord 423 is installed, thereby forming the recess part 422 on the additional airbag 420.

In the fifth embodiment, since inflation of the center portions of both the upper surface and the lower surface of the additional airbag 420 is restricted by the suspension cord 423, a recess part is also formed in the upper surface of the additional airbag 420 in addition to the lower surface of the additional airbag 420. However, the recess part on the upper surface of the additional airbag 420 does not in any way damage the ability of the additional airbag 420 to receive the head portion Dh of the passenger D.

Moreover, in the vehicle passenger restraint system 401 of the fifth embodiment, the deployments of the additional airbag 420 and the steering wheel airbag 421 are separated by a time difference such that the additional airbag 420 is inflated first and the steering wheel airbag 421 is inflated after the prescribed amount of time t1 has elapsed since the additional airbag 420 is inflated. More specifically, the vehicle passenger restraint system 401 of the fifth embodiment is preferably provided with a passenger restraint controller PRC configured and arranged to control the inflator 18 and the inflator 19 to deploy the additional airbag 220 and the steering wheel airbag 421, respectively, upon detection of the impact imparted from the front of the vehicle in the impact detector (s) as described below.

Figure 13:
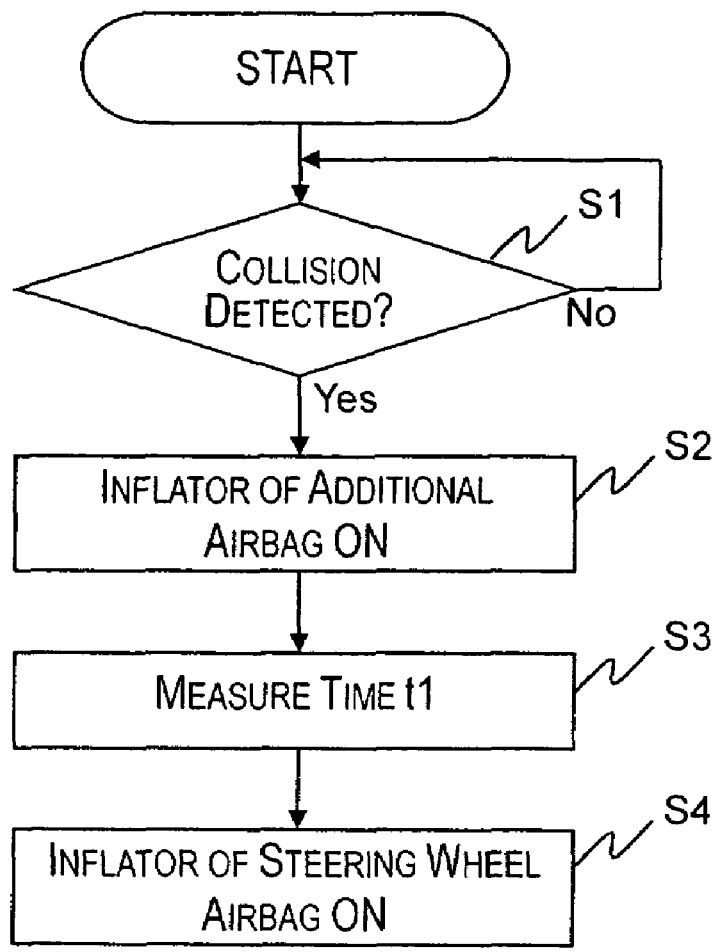
FIG. 13 is a flowchart describing control steps for controlling the deployment timing of the head restraining part and the steering wheel airbag of the vehicle passenger restraint system in accordance with the fifth embodiment of the present invention.

The timing of the deployment of the additional airbag 420 and the steering wheel airbag 421 will now be described in more detail with reference to FIG. 13, which is a flowchart illustrating control steps used to control the deployment timing of the additional airbag 420 and the steering wheel airbag 421.

In step S1, a determination as to whether a collision is detected or not is made. If the collision is detected in step S1, the control proceeds to step S2. In step S2, the inflator 18 of the additional airbag 420 is operated (turned ON) to deploy the additional airbag 420, then the control proceeds to step S3. In step S3, a prescribed amount of time t1 is measured and the control proceeds to step S4 when the prescribed amount of time t1 has elapsed. The prescribed mount of time t1 is preferably set to an amount of time difference required to ensure the steering wheel airbag 421 will readily engage with the recess part 422 of the additional airbag 420 when the additional airbag 420 and the steering wheel airbag 421 are inflated. In step S4, the inflator 19 of the steering wheel airbag 421 is operated (turned ON) to deploy the steering wheel airbag 421.

With the fifth embodiment of the present invention, the center portion of the upper surface of the steering wheel airbag 421 can be received or retained in the recess part 422 formed in the lower surface of the additional airbag 420 when the additional airbag 420 and the steering wheel airbag 421 have both inflated. Thus, the relative displacement between the additional airbag 420 and the steering wheel airbag 421 is prevented.

Figure 12:
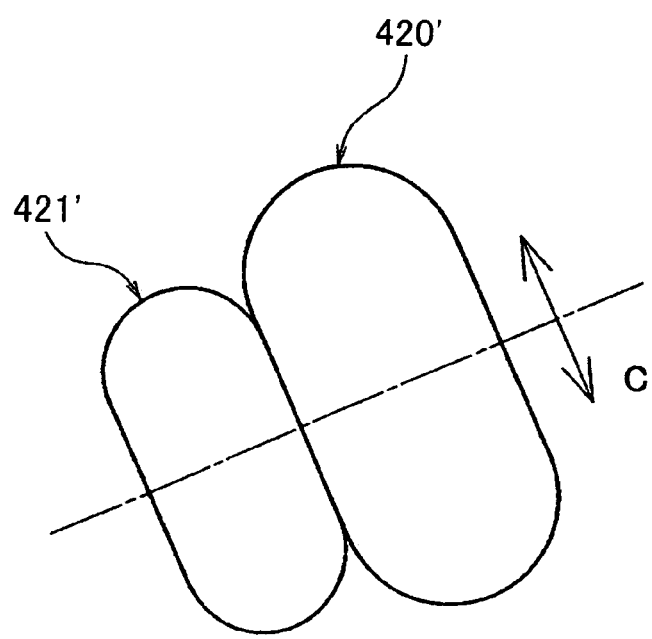
FIG. 12 is a diagrammatic cross sectional view corresponding to FIG. 11 illustrating a comparison example of a head restraining part and a steering wheel airbag for explaining a problem that is solved by the vehicle passenger restraint system in accordance with the fifth embodiment of the present invention.

For example, FIG. 12 illustrates a diagrammatic cross sectional view of a steering wheel airbag 421' and an additional airbag 420' without any recess part (displacement prevention mechanism). FIG. 12 is provided for the purpose of illustrating a problem that is solved by the vehicle passenger restraint system of the fifth embodiment of the present invention. In the case illustrated in FIG. 12, since the additional airbag 420 and the steering wheel airbag 421 are not provided with any displacement prevention mechanism, the additional airbag 420 and the steering wheel airbag 421 can easily shift positions relative to each other along the contact surfaces thereof (in direction of an arrow C in FIG. 12). On the other hand, since the recess part 422 is provided in the vehicle passenger restraint system 401 of the fifth embodiment, the relative displacement between the additional airbag 420 and the steering wheel airbag 421 in the C direction can be effectively reduced.

As a result, even if the head portion Dh of the passenger D strikes the additional airbag 420 while the additional airbag 420 and the steering wheel airbag 421 are overlapping each other, the additional airbag 420 and the steering wheel airbag 421 can maintain the overlapping state and absorb the energy of the impact of the head portion Dh of the passenger D in an efficient manner.

Additionally, since the recess part 422 of the fifth embodiment is formed by providing the suspension cord 423 inside the additional airbag 420, the recess part 422 can be formed simply and reliably.

Although the fifth embodiment illustrates a case in which the recess part 422 is provided in the additional airbag 420, the same effects can also be obtained by providing the recess part 422 in the steering wheel airbag 421 instead of the additional airbag 420. Of course, it will be apparent to those skilled in the art from this disclosure that when the recess part is provided in the steering wheel airbag 421, the deployment of the additional airbag 420 and the steering wheel airbag 421 are preferably arranged such that the steering wheel airbag 421 is inflated first, and the additional airbag 420 is inflated after a prescribed amount of time has elapsed since the steering wheel airbag 421 is inflated.

Accordingly, with the fifth embodiment of the present invention, the time difference is provided between the deployment of the additional airbag 420 and the deployment of the steering wheel airbag 421 such that the airbag 420 having the recess part 422 is inflated first and the steering wheel airbag 421 is inflated after the prescribed amount of time t1 has elapsed since the airbag 420 is inflated. The recess part 422 is formed in the additional airbag 420, which is inflated first, and the steering wheel airbag 421 can be inflated afterwards such that the steering wheel airbag 421 becomes wedged into the recess part 422 when the steering wheel airbag 421 is inflated. As a result, the steering wheel airbag 421 can be mated with the recess part 422 more reliably and the relative displacement between the additional airbag 420 and the steering wheel airbag 421 can be effectively suppressed.

Sixth Embodiment

Figure 14:
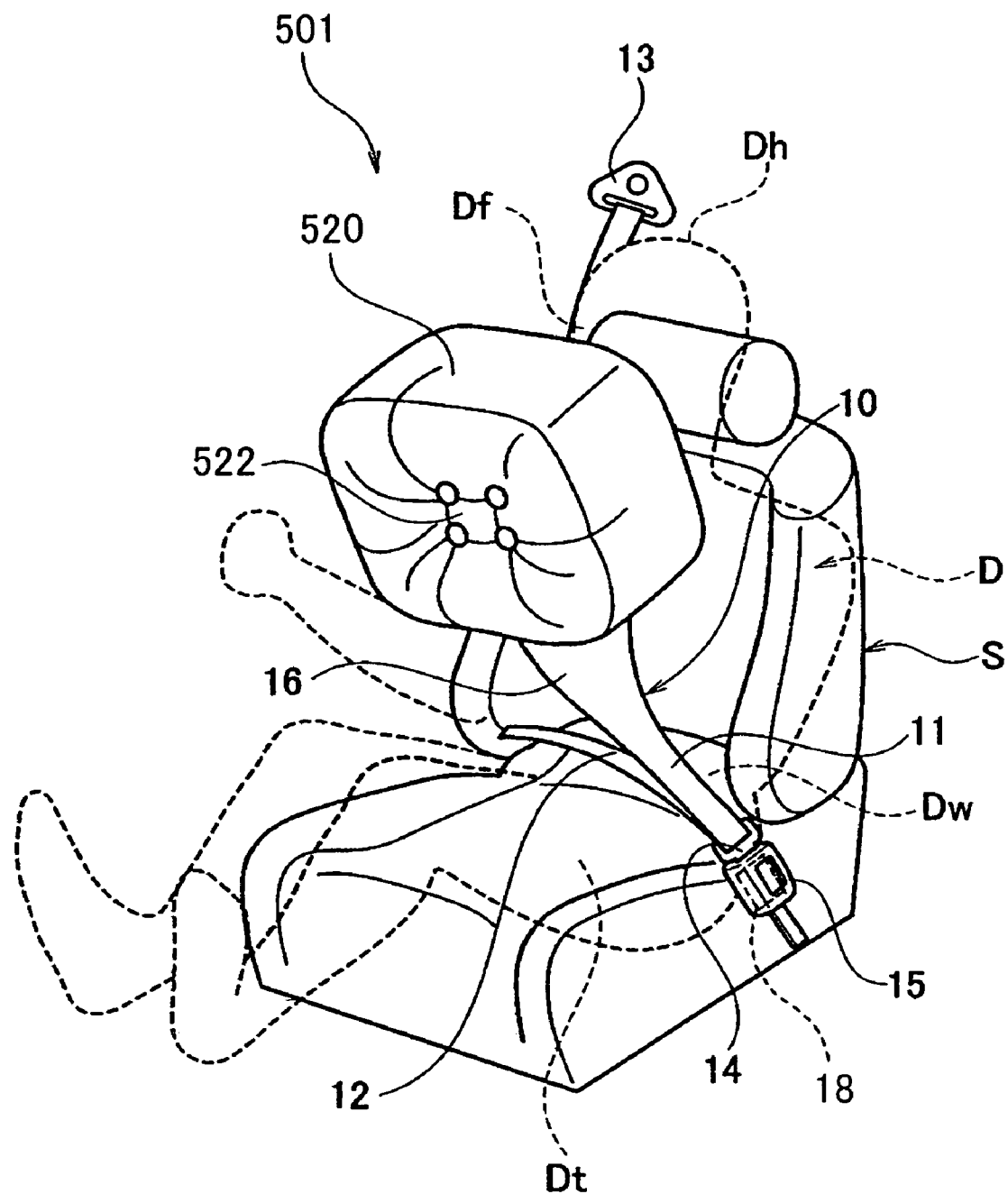
FIG. 14 is a frontal perspective view of a vehicle passenger restraint system when a head restraining part of the vehicle passenger restraint system is in a deployed state in accordance with a sixth embodiment of the present invention.
Figure 15:
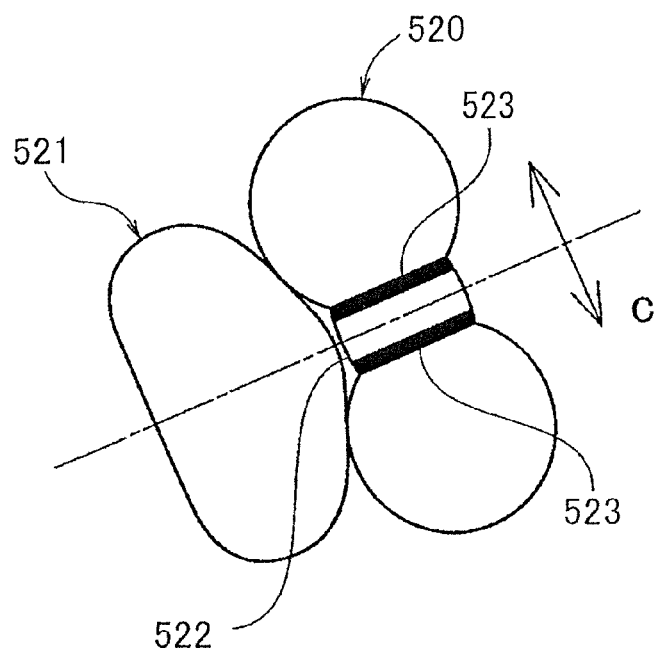
FIG. 15 is a diagrammatic cross sectional view of the head restraining part and a steering wheel airbag of the vehicle passenger restraint system in the deployed state in accordance with the sixth embodiment of the present invention.

Referring now to FIGS. 14 and 15, a vehicle passenger restraint system 501 in accordance with a sixth embodiment will now be explained. In view of the similarity between the fifth and sixth embodiments, the parts of the sixth embodiment that are identical to the parts of the fifth embodiment will be given the same reference numerals as the parts of the fifth embodiment. Moreover, the descriptions of the parts of the sixth embodiment that are identical to the parts of the fifth embodiment may be omitted for the sake of brevity.

The vehicle passenger restraint system 501 of the sixth embodiment is basically identical to the vehicle passenger restraint system 401 of the fifth embodiment except that an recess part 522 of an additional airbag 520 is formed using four suspension cords 523.

FIG. 14 is a frontal perspective view of the additional airbag 522 in the deployed state. FIG. 15 is a diagrammatic cross sectional view illustrating the additional airbag 520 and a steering wheel airbag 521 in the deployed state.

As shown in FIGS. 14 and 15, the vehicle passenger restraint system 501 of the sixth embodiment comprises the additional airbag 520 with the recess part 522 provided on a center portion of the lower surface of the additional airbag 520, similarly to the fifth embodiment. In the sixth embodiment, however, four suspension cords 523 are used as the expansion restricting member, which are arranged in a rectangular pattern as seen in FIG. 14.

Thus, with the sixth embodiment of the present invention, since the four suspension cords 523 are used to form the recess part 522 and the suspension cords 523 are arranged in a rectangular pattern, the surface area of the bottom surface of the recess part 522 (i.e., the surface area of the recess part 522 as a whole) can be increased and the portion that receives the steering wheel airbag 521 can be enlarged. As a result, relative displacement in a direction indicated by the arrow C in FIG. 15 between the additional airbag 520 and the steering wheel airbag 521 can be suppressed even more efficiently.

Of course it will be apparent to those skilled in the art from this disclosure that, in the sixth embodiment too, the recess part 522 can be provided in the steering wheel airbag 521 instead of the additional airbag 520.

Seventh Embodiment

Figure 16:
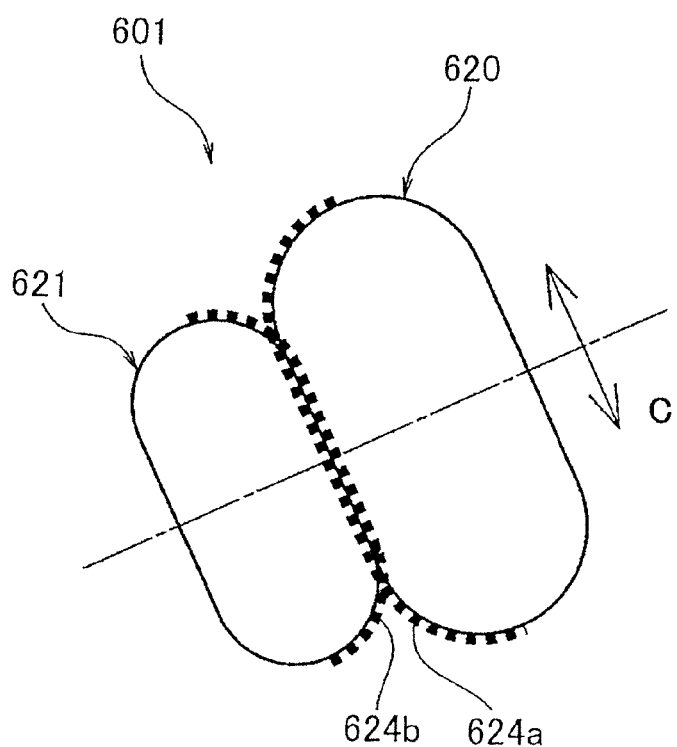
FIG. 16 is a diagrammatic cross sectional view of a head restraining part and a steering wheel airbag of a vehicle passenger restraint system in a deployed state in accordance with a seventh embodiment of the present invention.

Referring now to FIG. 16, a vehicle passenger restraint system 601 in accordance with a seventh embodiment will now be explained. In view of the similarity between the third and seventh embodiments, the parts of the seventh embodiment that are identical to the parts of the third embodiment will be given the same reference numerals as the parts of the third embodiment. Moreover, the descriptions of the parts of the seventh embodiment that are identical to the parts of the third embodiment may be omitted for the sake of brevity.

The vehicle passenger restraint system 601 of the seventh embodiment differs from the vehicle passenger restraint system 201 of the third embodiment in that an additional airbag 620 and a steering wheel airbag 621 are provided with a displacement prevention mechanism for suppressing the relative displacement between the additional airbag 620 and the steering wheel airbag 621, which is arranged as high friction coefficient members 624a and 624b provided on the surfaces of the additional airbag 620 and the steering wheel airbag 621 that face each other.

FIG. 16 is a diagrammatic cross sectional view illustrating the additional airbag 620 and the steering wheel airbag 621 in the deployed state.

As shown in FIG. 16, the vehicle passenger restraint system 601 of the seventh embodiment is provided with the steering wheel airbag 621 in addition to the additional airbag 620, similarly to the third embodiment. The vehicle passenger restraint system 601 is further configured such that both the additional airbag 620 and the steering wheel airbag 621 are provided with the high friction coefficient members 624a and 624b, respectively, on the surfaces thereof that are arranged to contact each other when the additional airbag 620 and the steering wheel airbag 621 are inflated.

The high friction coefficient members 624a and 624b can be formed by applying a coating that increases the coefficient of friction to the lower surface of the additional airbag 620 and the upper surface of the steering wheel airbag 621. Alternatively, the high friction coefficient members 624a and 624b can be formed by using a fabric having a high coefficient of friction for the lower surface of the additional airbag 620 and the upper surface of the steering wheel airbag 621.

With vehicle passenger restraint system 601 of the seventh embodiment, the high friction coefficient members 624a and 624b provided on the respective contact surfaces of the additional airbag 620 and the steering wheel airbag 621 are configured and arranged to suppress the relative displacement of the additional airbag 620 and the steering wheel airbag 621 in a direction indicated by the arrow C in FIG. 16 when the additional airbag 620 and the steering wheel airbag 621 are inflated.

Although the seventh embodiment is explained as a case in which the high friction coefficient members 624a and 624b are provided on both the additional airbag 620 and the steering wheel airbag 621, the relative displacement of the additional airbag 620 and the steering wheel airbag 621 can also be suppressed when a high friction coefficient member is provided on only one of the additional airbag 620 and the steering wheel airbag 621.

Eighth Embodiment

Figure 17:
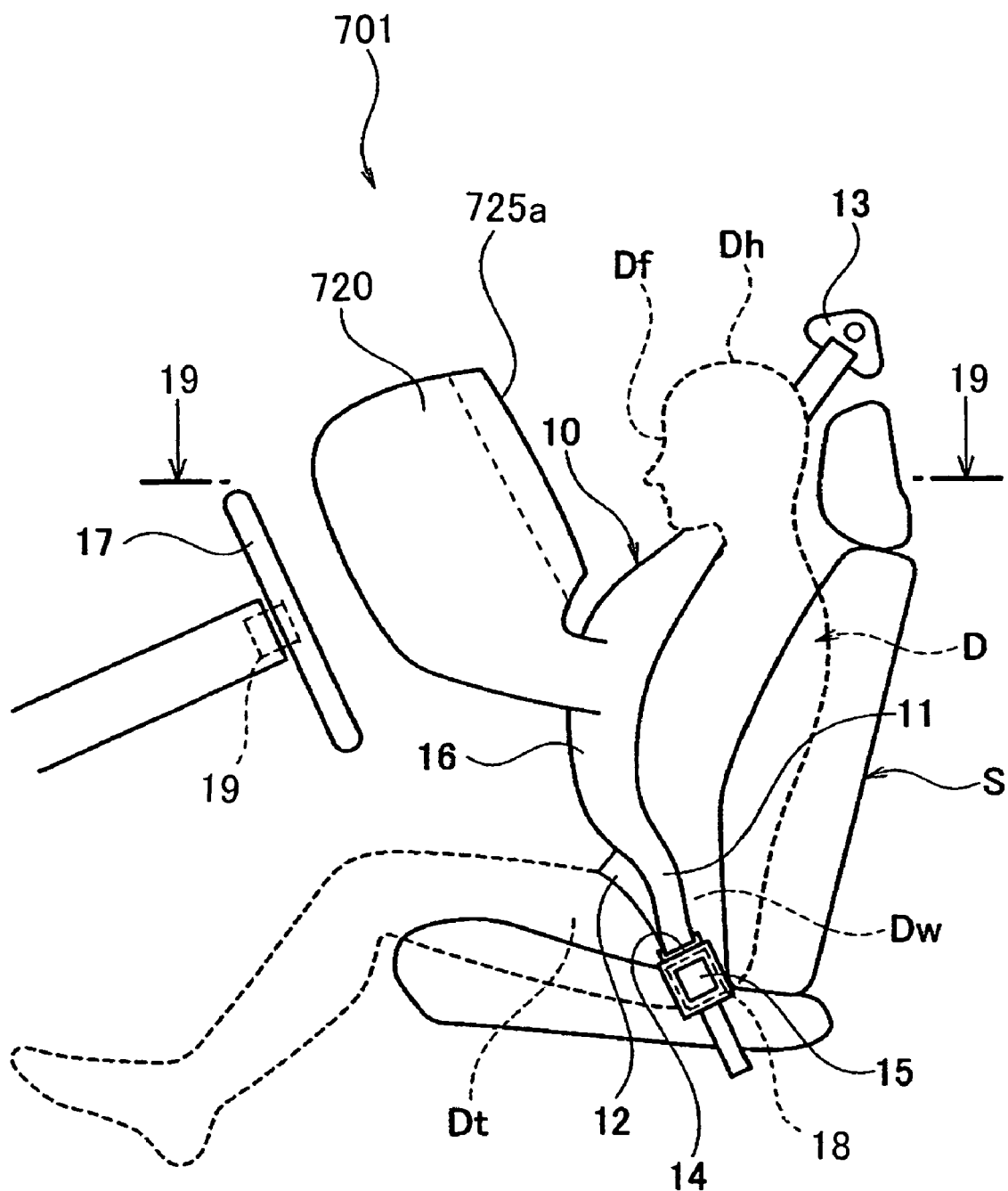
FIG. 17 is a side elevational view of a vehicle passenger restraint system when a head restraining part of the vehicle passenger restraint system is in a deployed state in accordance with an eighth embodiment of the present invention.
Figure 18:
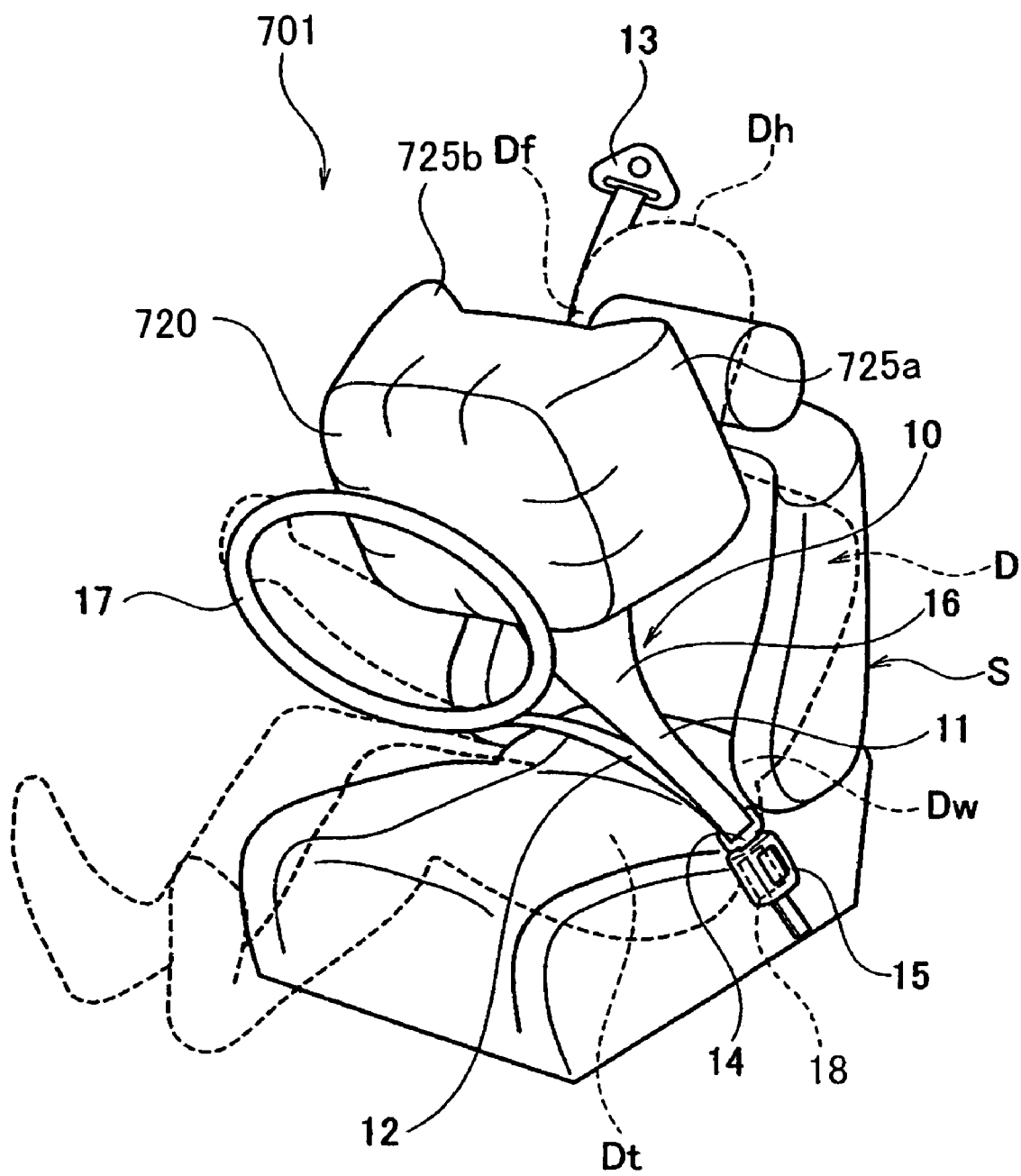
FIG. 18 is a frontal perspective view of the vehicle passenger restraint system when the head restraining part of the vehicle passenger restraint system is in the deployed state in accordance with the eighth embodiment of the present invention.
Figure 19:
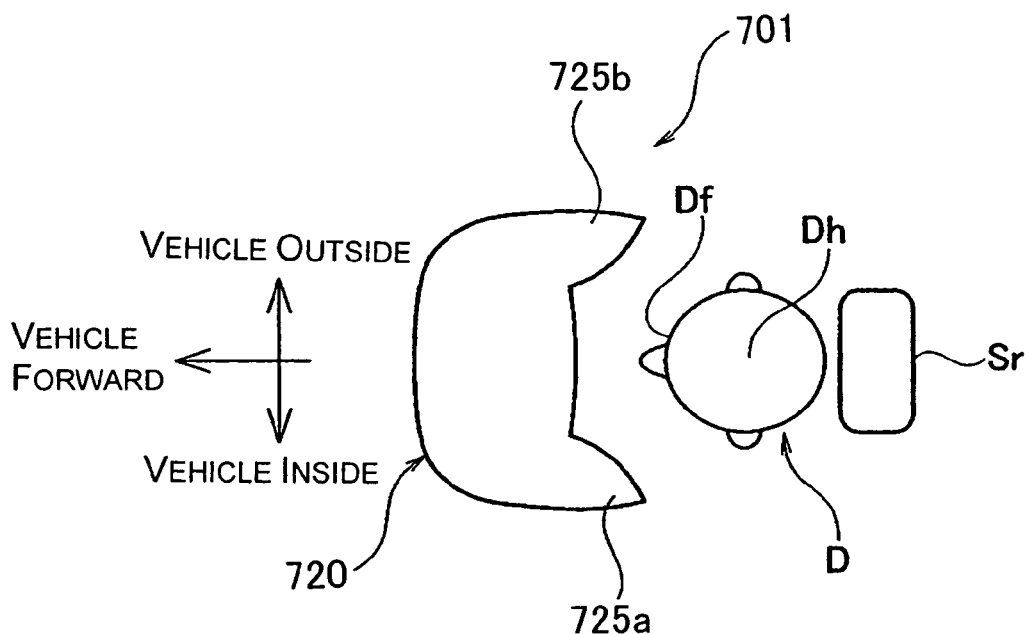
FIG. 19 is a diagrammatic cross sectional view for illustrating a structure of the head restraining part of the vehicle passenger restraint system in accordance with the eighth embodiment of the present invention taken along a section line 19-19 of FIG. 17.

Referring now to FIGS. 17 to 19, a vehicle passenger restraint system 701 in accordance with an eighth embodiment will now be explained. In view of the similarity between the first and eighth embodiments, the parts of the eighth embodiment that are identical to the parts of the first embodiment will be given the same reference numerals as the parts of the first embodiment. Moreover, the descriptions of the parts of the eighth embodiment that are identical to the parts of the first embodiment may be omitted for the sake of brevity.

The vehicle passenger restraint system 701 of the eighth embodiment is basically identical to the vehicle passenger restraint system 1 of the first embodiment except that an additional airbag 720 of the eighth embodiment includes a pair of projections 725a and 725b for preventing the head portion Dh of the passenger D from sliding off from the additional airbag 720.

FIG. 17 is a left side elevational view of the vehicle passenger restraint system 701 in the deployed state of the additional airbag 720. FIG. 18 is a frontal perspective view of the vehicle passenger restraint system 701 in the deployed state of the additional airbag 720. FIG. 19 is a diagrammatic cross sectional view illustrating the additional airbag 720 taken along a section line 19-19 of FIG. 17.

As shown in FIGS. 17 and 18, the vehicle passenger restraint system 701 of the eighth embodiment is configured and arranged such that the belt inflatable part 16 of the shoulder belt 11 is provided with the additional airbag 720, similarly to the first embodiment. As shown in FIG. 19, the additional airbag 720 of the eighth embodiment further includes a pair of left and right projections 725a and 725b that are configured and arranged to protrude toward the passenger D from both lateral sides, i.e., the transversely rightward and leftward facing sides, of the additional airbag 720 when the additional airbag 720 is inflated. In FIG. 19, the reference symbol "Sr" indicates the headrest of the driver's seat S.

The projections 725a and 725b are preferably formed integrally with the additional airbag 720 such that the projections 725a and 725b are inflated simultaneously with the additional airbag 720. Moreover, the projections 725a and 725b are arranged to have a prescribed height as measured from the upper surface of the additional airbag 720 so that both projections 725a and 725b protrude from the additional airbag 720 by approximately the same amount as seen in FIG. 19.

Accordingly, with the vehicle passenger restraint system 701 of the eighth embodiment, if an oblique frontal collision occurs in which the head portion Dh of the passenger D contacts the additional airbag 720 from an oblique direction, the head portion Dh of the passenger D can be retained in the additional airbag 720 by the projection 725a or 725b that lies along the oblique movement path of the head portion Dh of the passenger D. As a result, the head portion Dh (face Df) of the passenger D can be prevented from sliding off the additional airbag 720.

Ninth Embodiment

Figure 20:
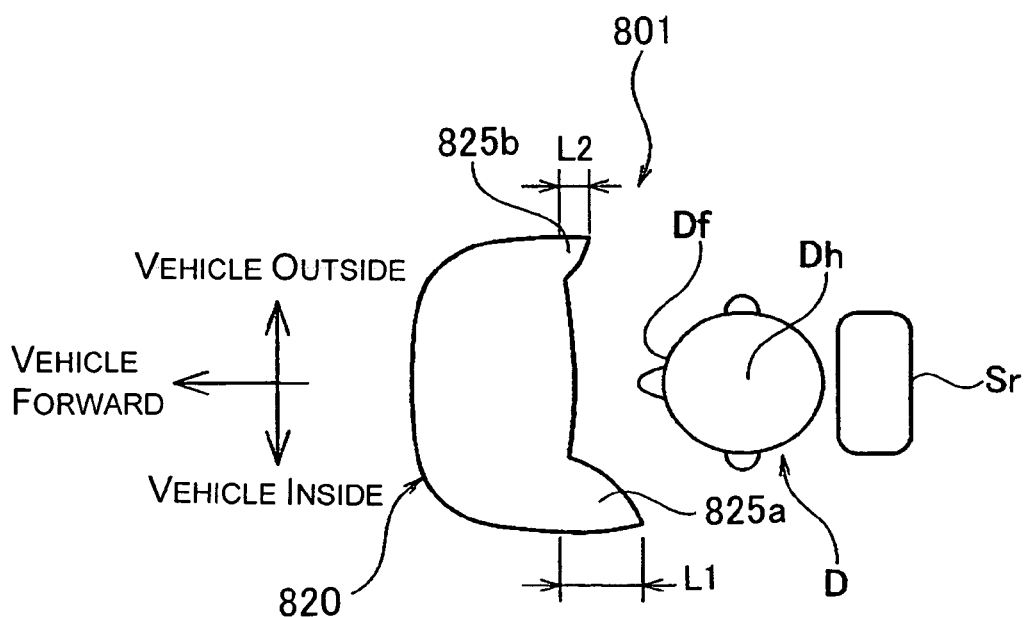
FIG. 20 is a diagrammatic cross sectional view corresponding to FIG. 19 for illustrating a structure of a head restraining part of a vehicle passenger restraint system in accordance with a ninth embodiment of the present invention.

Referring now to FIG. 20, a vehicle passenger restraint system 801 in accordance with a ninth embodiment will now be explained. In view of the similarity between the eighth and ninth embodiments, the parts of the ninth embodiment that are identical to the parts of the eighth embodiment will be given the same reference numerals as the parts of the eighth embodiment. Moreover, the descriptions of the parts of the ninth embodiment that are identical to the parts of the eighth embodiment may be omitted for the sake of brevity.

The vehicle passenger restraint system 801 of the ninth embodiment is basically identical to the vehicle passenger restraint system 701 of the eighth embodiment except that a pair of projections 825a and 825b formed on an additional airbag 820 is arranged to have different heights as measured from the upper surface of the additional airbag 820.

FIG. 20 is a diagrammatic cross sectional view, which corresponds to FIG. 19, illustrating the additional airbag 820 of the eighth embodiment.

As shown in FIG. 20, the vehicle passenger restraint system 801 of the ninth embodiment is configured to have the left and right projections 825a and 825b provided on both lateral sides, i.e., the transversely rightward and leftward facing sides, of the additional airbag 820, similarly to the eighth embodiment. In the ninth embodiment, the heights of the left and right projections 825a and 825b are configured and arranged such that a projection amount L2 of the projection 825b disposed on the side where the shoulder belt 11 (see FIGS. 1 and 2) rests on the shoulder area of the passenger D (i.e., the projection 825b positioned closer to the outside of the vehicle) is smaller than a projection amount L1 of the projection 825a positioned on the opposite side (i.e., positioned toward the inside of the vehicle).

When the vehicle undergoes a collision in which an impact force is imparted in an oblique frontal direction and when the impact force acts on the passenger D from a direction oriented obliquely forward and toward the outside of the vehicle, the passenger D will move with respect to the vehicle in a direction oriented obliquely forward and toward the outside of the vehicle due to the inertia force. In such a case, the shoulder belt 11 will be pushed in the same direction (toward the outside of the vehicle) by the shoulder area of the passenger D and therefore move in that direction. As a result, the additional airbag 820 provided on the shoulder belt 11 will also move to some degree in the same direction as the passenger D.

On the other hand, when the impact force acts on the passenger D from a direction oriented obliquely forward and toward the inside of the vehicle, the passenger D will move with respect to the vehicle in a direction oriented obliquely forward and toward the inside of the vehicle due to the inertia force. In such a case, the shoulder area of the passenger D will slip out of the shoulder belt 11 and the passenger D alone will move with respect to the vehicle in the direction toward the inside of the vehicle. As a result, the additional airbag 820 moves very little in the direction that the passenger D moves. Therefore, in such a case, the face Df and the head portion Dh of the passenger D can easily slip off from the additional airbag 820 if the projection 825*a* is not provided on the additional airbag 820.

Accordingly, even though the projection amount L2 of the projection 825*b* positioned on the side where the shoulder belt 11 rests on the shoulder area of the passenger D is smaller than the projection amount L1 of the projection 825*a* disposed on the opposite side, the effect of preventing the head portion Dh of the passenger D from slipping off from the additional airbag 820 is sufficient because the additional airbag 820 moves in the same direction as the passenger D in cases in which the collision causes the head portion Dh of the passenger D to move toward the projection 825*b*.

Since the projection 825*b* on one side can be reduced in size, the size of the additional airbag 820 when folded up can be reduced. Thus, the additional airbag 820 can be stored more readily in the shoulder belt 11.

Tenth Embodiment

Figure 21:
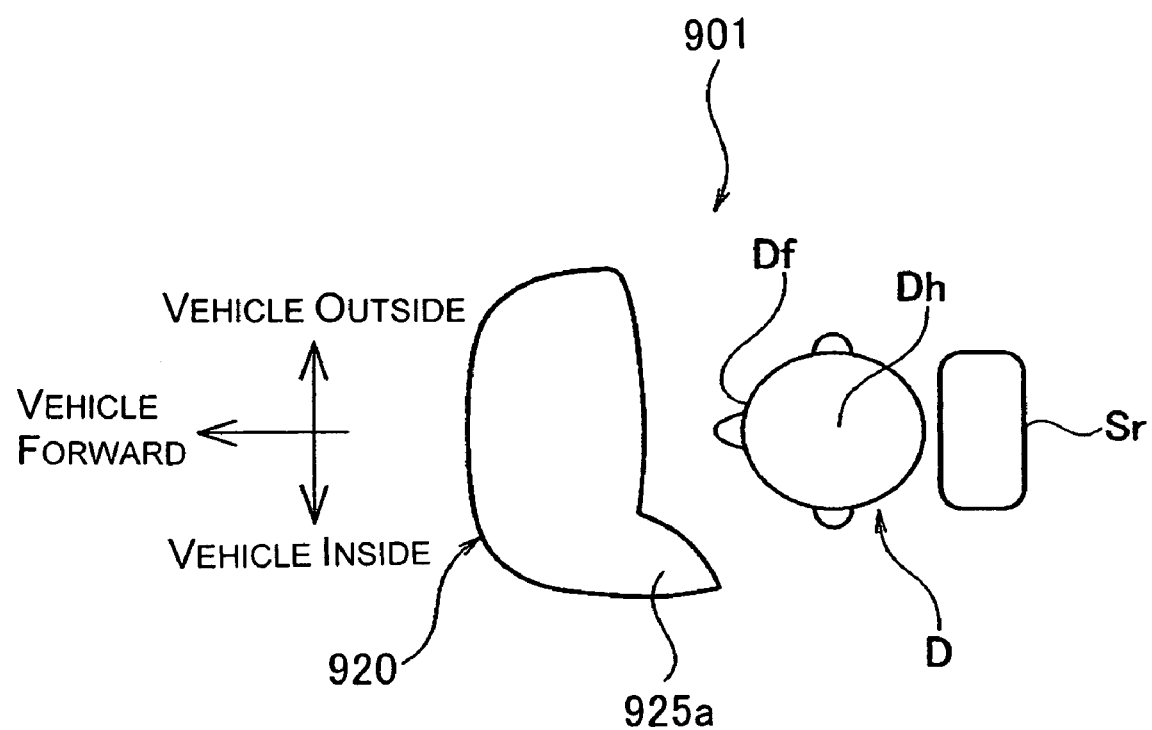
FIG. 21 is a diagrammatic cross sectional view corresponding to FIG. 19 for illustrating a structure of a head restraining part of a vehicle passenger restraint system in accordance with a tenth embodiment of the present invention.

Referring now to FIG. 21, a vehicle passenger restraint system 901 in accordance with a tenth embodiment will now be explained. In view of the similarity between the ninth and tenth embodiments, the parts of the tenth embodiment that are identical to the parts of the ninth embodiment will be given the same reference numerals as the parts of the ninth embodiment. Moreover, the descriptions of the parts of the tenth embodiment that are identical to the parts of the ninth embodiment may be omitted for the sake of brevity.

The vehicle passenger restraint system 901 of the tenth embodiment is basically identical to the vehicle passenger restraint system 801 of the ninth embodiment except that an additional airbag 920 of the tenth embodiment is provided with only one projection 925*a* on one lateral side instead of two projections 825*a* and 825*b* as in the ninth embodiments.

FIG. 21 is a diagrammatic cross sectional view, which corresponds to FIG. 19, illustrating the additional airbag 920 of the tenth embodiment.

As shown in FIG. 21, the vehicle passenger restraint system 901 of the tenth embodiment comprises the additional airbag 920 similarly to the eighth and ninth embodiments. However, in the tenth embodiment, only one projection 925*a* that is configured and arranged to protrude toward the passenger D when the additional airbag 920 is inflated is provided on the lateral side of the additional airbag 920 that is opposite the side corresponding to where the shoulder belt 11 (see FIGS. 1 and 2) rests on the shoulder area of the passenger D. In other words, in the tenth embodiment shown in FIG. 21, the projection 925*a* is formed on the transversely leftward facing side of the additional airbag 920 as shown in FIG. 21.

Thus, with the vehicle passenger restraint system 901 of the tenth embodiment, similarly to the ninth embodiment, when the impact force acts on the passenger D in a direction oriented obliquely forward and toward the outside of the vehicle, the additional airbag 920 moves to some degree in the same direction as the passenger D. Consequently, the need for a projection on the side of the additional airbag 920 corresponding to where the shoulder belt 11 rests on the shoulder area of the passenger D is diminished. Thus, it is sufficient to provide only the projection 925*a* on the opposite side of the additional airbag 920. By eliminating the less necessary projection, the size of the additional airbag 920 when folded up can be reduced further. Therefore, the additional airbag 920 can be stored even more readily in the shoulder belt 11.

Although the above descriptions are provided for the cases in which the vehicle passenger restraint system of the present invention is applied to the driver's seat S, it will be apparent to those skilled in the art from this disclosure that the vehicle passenger restraint system of the present invention can also be applied to a passenger seat or a back seat.

More specifically, when the present invention is applied to a passenger seat, the instrument panel disposed in from of the passenger seat is the frontward vehicle part and the frontward airbag is preferably provided in the instrument panel. Moreover, when the present invention is applied to a back seat, a front seat disposed in front of the back seat is the frontward vehicle part and the frontward airbag is preferably provided in the front seat.

As used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "detect" as used herein to describe an operation or function carried out by a component, a section, a device or the like includes a component, a section, a device or the like that does not require physical detection, but rather includes determining or computing or the like to carry out the operation or function.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle passenger restraint system comprising:
   a seatbelt having a lap belt, a shoulder belt, a seat belt buckle tongue arranged between the lap belt and the shoulder belt, the shoulder belt being configured and arranged to extend diagonally from a first side of a passenger in a shoulder area to a second side of the passenger that is opposite from the first side in a waist area to restrain the passenger to a seat of a vehicle, the shoulder belt having a belt inflatable part to be inflated with a fluid at a location of the shoulder belt configured to correspond to a chest portion of a passenger under a predeployment condition and configured to expand towards the chest portion of the passenger for increasing tension in the lap belt and shoulder belt when expanding towards the chest portion of the passenger;
   an inner seat belt buckle including an inflator being configured to generate the fluid, the seat belt buckle tongue being configured and arranged to be attached to and detached from the inner seat belt buckle; and
   an inflatable head restraining part extending from the belt inflatable part and including a head restraining body and a channel portion with the channel portion fluidly communicating between the head restraining body and the belt inflatable part and forming a narrower fluid path than the head restraining body, and the inflatable head restraining part configured and arranged to expand with the fluid supplied through the belt inflatable part from a location of the belt inflatable part configured to correspond to the chest portion of the passenger in a forward direction of the vehicle relative to the belt inflatable part to restrain forward movement of a head portion of the passenger as the belt inflatable part is inflated with the fluid from the inflator in the inner seat belt buckle.

2. The vehicle passenger restraint system as recited in claim 1, wherein
the head restraining part is stored in the belt inflatable part under the predeployment condition, and configured and arranged to be inflated along with the belt inflatable part upon detection of an impact.

3. The vehicle passenger restraint system as recited in claim 1, wherein
the head restraining part is configured and arranged to inflate to a position between the head portion of the passenger and a frontward vehicle part that is disposed in the forward direction of the vehicle with respect to the head portion of the passenger when the head restraining part is inflated.

4. The vehicle passenger restraint system as recited in claim 1, wherein
the head restraining part and the belt inflatable part are fluidly connected to be inflated together by introducing the fluid.

5. The vehicle passenger restraint system as recited in claim 1, wherein
the head restraining part includes a fluid discharge port with a prescribed discharge resistance configured and arranged to adjust an impact absorbency of the head restraining part.

6. The vehicle passenger restraint system as recited in claim 3, further comprising
a frontward airbag stored in a frontward vehicle part, and configured and arranged to be deployed upon detection of an impact.

7. The vehicle passenger restraint system as recited in claim 6, wherein
the frontward airbag is configured and arranged to be deployed simultaneously with the head restraining part upon the detection of the impact.

8. The vehicle passenger restraint system as recited in claim 6, wherein
the frontward airbag is configured and arranged to be deployed upon the detection of the impact being equal to or greater than a threshold value.

9. The vehicle passenger restraint system as recited in claim 8, wherein
the head restraining part is configured and arranged to be deployed upon the detection of the impact being smaller than the threshold value.

10. The vehicle passenger restraint system as recited in claim 6, wherein
at least one of the head restraining part and the frontward airbag includes a displacement prevention mechanism configured and arranged to prevent a relative displacement between the head restraining part and the frontward airbag when both the head restraining part and the frontward airbag are deployed.

11. The vehicle passenger restraint system as recited in claim 10, wherein
the displacement prevention mechanism is arranged as a recess part formed on a surface of one of the head restraining part and the frontward airbag that is configured and arranged to contact the other one of the head restraining part and the frontward airbag when both of the head restraining part and the frontward airbag are inflated, the recess part being configured and arranged to retain the other one of the head restraining part and the frontward airbag to prevent the relative displacement between the head restraining part and the frontward airbag.

12. The vehicle passenger restraint system as recited in claim 11, wherein
the recess part includes an expansion restricting member inside the one of the head restraining part and the frontward airbag such that inflation of the one of the head restraining part and the frontward airbag is suppressed in an area around the expansion restricting member.

13. The vehicle passenger restraint system as recited in claim 10, wherein
the displacement prevention mechanism includes a high friction coefficient member formed on a surface of at least one of the head restraining part and the frontward airbag that is configured and arranged to contact the other one of the head restraining part and the frontward airbag when the head restraining part and the frontward airbag are inflated.

14. The vehicle passenger restraint system as recited in claim 11, wherein
the head restraining part and the frontward airbag are configured and arranged such that the one of the head restraining part and the frontward airbag with the recess part is deployed earlier than the other one of the head restraining part and the frontward airbag so that a prescribed time delay exists between deployments of the head restraining part and the frontward airbag.

15. The vehicle passenger restraint system as recited in claim 1, further comprising
the head restraining part is configured and arranged to prevent the head portion of the passenger from slipping off from the head restraining part when the head restraining part is inflated.

16. The vehicle passenger restraint system as recited in claim 15, wherein
the head restraining part includes a pair of first and second projections configured and arranged to protrude from the head restraining part toward the passenger at transverse end portions of the head restraining part when the head restraining part is inflated.

17. The vehicle passenger restraint system as recited in claim 16, wherein
the first and second projections are configured and arranged to protrude from the head restraining part by first and second heights, respectively, the first projection being disposed closer to a first side of the passenger and the second projection being disposed closer to a second side of the passenger, the first height of the first projection being larger than the second height of the second projection.

18. The vehicle passenger restraint system as recited in claim 15, wherein
the head restraining part includes a projection configured and arranged to protrude toward the passenger, the projection being disposed on a transverse end portion of the head restraining part that is closer to a first side of the passenger.

19. A vehicle passenger restraint system comprising:
passenger body restraining means for restraining a body of a passenger to a seat of a vehicle in a waist area of the passenger and diagonally from a shoulder area on a first side of the passenger to the waist area on a second side of the passenger, the passenger body restraining means including a seat belt buckle tongue and an inner seat belt buckle including an inflator being configured to generate a fluid, the seat belt buckle tongue being configured and arranged to be attached to and detached from the inner seat belt buckle;

passenger restraining force increasing means for applying a tension to the passenger body restraining means to increase a restraining force by which the passenger body restraining means restrains the body of the passenger to the seat by inflating a belt inflatable part of the passenger body restraining means with the fluid from the inflator in the inner seat belt buckle, the belt inflatable part of the passenger body restraining means being configured to extend diagonally across the passenger and configured to expand towards a chest portion of the passenger for increasing tension in the passenger body restraining means when expanding towards the chest portion of the passenger; and head restraining means for preventing a head portion of the passenger from contacting a frontward vehicle part disposed in a frontward direction with respect to the passenger in which the head restraining means inflates from a location of a part of the passenger body restraining means configured to correspond to the chest portion of the passenger in the frontward direction with the fluid supplied though the belt inflatable part, the head restraining means including a head restraining body and a channel portion with the channel portion fluidly communicating between the head restraining body and the belt inflatable part and forming a narrower fluid path than the head restraining body.

20. A vehicle passenger restraining method comprising:

restraining a body of a passenger to a seat of a vehicle by a lap belt and a shoulder belt;

applying a tension to the lap belt and the shoulder belt to increase a restraining force by which the shoulder belt restrains the body of the passenger to the seat by inflating a belt inflatable part of the shoulder belt with a fluid generated by an inflator disposed in an inner seat belt buckle, which selectively receives a seat belt buckle tongue arranged between the lap belt and the shoulder belt; and inflating a head restraining part with the fluid supplied through the belt inflatable part to expand upwardly forwardly with respect to the shoulder belt from a location of the belt inflatable part configured to correspond to a chest portion of the passenger to prevent a head portion of the passenger from contacting a frontward vehicle part disposed in a frontward direction with respect to the passenger, the head restraining part including a head restraining body and a channel portion with the channel portion fluidly communicating between the head restraining body and the belt inflatable part and forming a narrower fluid path than the head restraining body.

* * * * *